(12) United States Patent
Suh

(10) Patent No.: US 12,250,550 B2
(45) Date of Patent: Mar. 11, 2025

(54) METHOD AND APPARATUS FOR USING NAS MESSAGE FOR DATA PROTECTION

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/710,846

(22) Filed: Mar. 31, 2022

(65) Prior Publication Data
US 2022/0330028 A1 Oct. 13, 2022

(30) Foreign Application Priority Data
Mar. 31, 2021 (KR) .................. 10-2021-0041929

(51) Int. Cl.
*H04W 12/37* (2021.01)
*H04W 12/10* (2021.01)
*H04W 60/04* (2009.01)

(52) U.S. Cl.
CPC .......... *H04W 12/37* (2021.01); *H04W 12/10* (2013.01); *H04W 60/04* (2013.01)

(58) Field of Classification Search
None
See application file for complete search history.

(56) References Cited

U.S. PATENT DOCUMENTS

| 9,629,028 | B2 | 4/2017 | Meylan et al. | |
| 10,944,786 | B2 * | 3/2021 | Chen | H04W 8/24 |
| 2019/0098597 | A1 * | 3/2019 | Basu Mallick | H04L 45/04 |
| 2020/0084631 | A1 * | 3/2020 | Zhang | H04W 12/106 |
| 2021/0014688 | A1 * | 1/2021 | Ito | H04W 12/106 |
| 2022/0078677 | A1 * | 3/2022 | Yin | H04W 36/06 |
| 2022/0201488 | A1 * | 6/2022 | Liu | H04W 12/106 |
| 2022/0240213 | A1 * | 7/2022 | Ly | H04W 60/04 |
| 2024/0196218 | A1 * | 6/2024 | Ito | H04W 36/14 |

FOREIGN PATENT DOCUMENTS

| CN | 108235300 B | 5/2020 |
| EP | 3541105 A1 | 9/2019 |
| WO | 2020/153894 A1 | 7/2020 |

OTHER PUBLICATIONS

RAN WG3, "Enforcement of maximum supported data rate for integrity protection", 3GPP TSG SA WG3 Meeting #94, Jan. 18, 2019, S3-190038, 3 pages.

(Continued)

*Primary Examiner* — Eunsook Choi

(57) ABSTRACT

A method, performed by a user equipment (UE), for protecting data includes: transmitting an attach request message including at least one security protection parameter regarding a UE capability to support a security protection for a user plane, to a mobility management entity (MME) via a base station; and in case that a security policy is determined at a policy charging function (PCF) based on the attach request message and information of the security policy is received at the MME, receiving an attach accept message including at least one security protection parameter regarding a network capability for the security policy related with an evolved packet system (EPS) bearer, from the MME via the base station.

16 Claims, 9 Drawing Sheets

(56) References Cited

OTHER PUBLICATIONS

RAN2, "LS on maximum data rate of user plane integrity protected data", 3GPP TSG SA WG2 Meeting #S2-125, Feb. 1, 2018, S2-181420, 3 pages.
Notification of Transmittal of the International Search Report and the Written Opinion of the International Searching Authority, or the Declaration dated Jun. 17, 2022 in connection with International Patent Application No. PCT/KR2022/004517, 11 pages.
Supplementary European Search Report dated May 15, 2024, in connection with European Application No. 22781615.4, 10 pages.
3GPP TS 23.501 V16.6.0 (Sep. 2020), Technical Specification, 3rd Generation Partnership Project; Technical Specification Group Services and System Aspects; System architecture for the 5G System (5GS); Stage 2 (Release 16), Sep. 2020, 447 pages.
Piggybacking (data transmission), Wikipedia, Jun. 2020, 2 pages.

* cited by examiner

METHOD AND APPARATUS FOR USING NAS MESSAGE FOR DATA PROTECTION

CROSS-REFERENCE TO RELATED APPLICATION

This application is based on and claims priority under 35 U.S.C. § 119 to Korean Patent Application No. 10-2021-0041929, filed on Mar. 31, 2021, in the Korean Intellectual Property Office, the disclosure of which is incorporated by reference herein in its entirety.

BACKGROUND

1. Field

The disclosure relates to a method and apparatus for data security in a wireless communication system. More particularly, the disclosure relates to a method and apparatus for enabling a user equipment or a network to support data security in a fourth, fifth, or sixth generation (4G, 5G, or 6G) wireless communication environment.

2. Description of the Related Art

Considering a process of development of radio communication from generation to generation, technologies have been developed mainly for services targeting humans, such as voice calls, multimedia services, data services, or the like. Following commercialization of fifth-generation (5G) communication systems, connected devices that will exponentially grow are expected to be connected to communication networks. As examples of things connected to networks, there may be cars, robots, drones, appliances, displays, smart sensors installed in various infrastructures, construction machinery, factory equipment, etc. Mobile devices may be expected to evolve to various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop improved 6G communication systems. For these reasons, 6G communication systems are referred to as beyond-5G systems.

In the 6G communication system expected to be commercialized around 2030, a maximum transfer rate is tera bits per second (bps), i.e., 1000 giga bps, and a maximum radio latency is 100 microseconds (pec). In other words, compared to the 5G communication system, the transfer rate becomes 50 times faster and the radio latency is reduced to a tenth (1/10) in the 6G communication system.

To attain these high data transfer rates and ultra-low latency, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, may be expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FFD-MIMO), array antennas, multiple antenna transmission technologies such as large scale antennas, etc., need to be developed. Besides, new technologies for improving coverage of THz band signals, such as meta-material based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience become possible through hyper-connectivity of the 6G communication system including not only connections between things but also connections between humans and things. Specifically, it is predicted that services such as truly immersive extended reality (truly immersive XR), high-fidelity mobile hologram, digital replica, etc., may be provided. Furthermore, services such as remote surgery, industrial automation and emergency response with enhanced security and reliability may be provided through the 6G communication system to be applied in various areas such as industry, medical care, vehicles, appliances, etc.

SUMMARY

The disclosure provides a method and apparatus for data security in a fourth-, fifth-, or sixth generation (4G, 5G, or 6G) wireless communication system. Specifically, the disclosure relates to a method and apparatus for enabling a user equipment or a network to support data security.

Additional aspects will be set forth in part in the description which follows and, in part, will be apparent from the description, or may be learned by practice of the presented embodiments of the disclosure.

According to an embodiment of the disclosure, a method, performed by a user equipment (UE), for protecting data includes: transmitting an attach request message including at least one security protection parameter regarding a UE capability to support a security protection for a user plane, to a mobility management entity (MME) via a base station; and in case that a security policy is determined at a policy charging function (PCF) based on the attach request message and information of the security policy is received at the MME, receiving an attach accept message including at least one security protection parameter regarding a network capability for the security policy related with an evolved packet system (EPS) bearer, from the MME via the base station.

According to an embodiment of the disclosure, a method, performed by an MME, for protecting data includes: receiving an attach request message including at least one security protection parameter regarding a UE capability to support a security protection for a user plane, from a UE via a base station; and in case that a security policy is determined at a PCF based on the attach request message and information of the security policy is received at the MME, transmitting an attach accept message including at least one security protection parameter regarding a network capability for the security policy related with an EPS bearer, to the UE via the base station.

According to an embodiment of the disclosure, a UE for protecting data includes: a transceiver; and a processor coupled with the transceiver and configured to: transmit an attach request message including at least one security protection parameter regarding a UE capability to support a security protection for a user plane, to an MME via a base station, and in case that a security policy is determined at a PCF based on the attach request message and information of the security policy is received at the MME, receive an attach accept message including at least one security protection parameter regarding a network capability for the security policy related with an EPS bearer, from the MME via the base station.

According to an embodiment of the disclosure, an MME for protecting data includes: a transceiver; and a processor coupled with the transceiver and configured to: receive an attach request message including at least one security protection parameter regarding a UE capability to support a security protection for a user plane, from a UE via a base station, and in case that a security policy is determined at a PCF based on the attach request message and information of the security policy is received at the MME, transmit an attach accept message including at least one security protection parameter regarding a network capability for the security policy related with an EPS bearer, to the UE, via the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
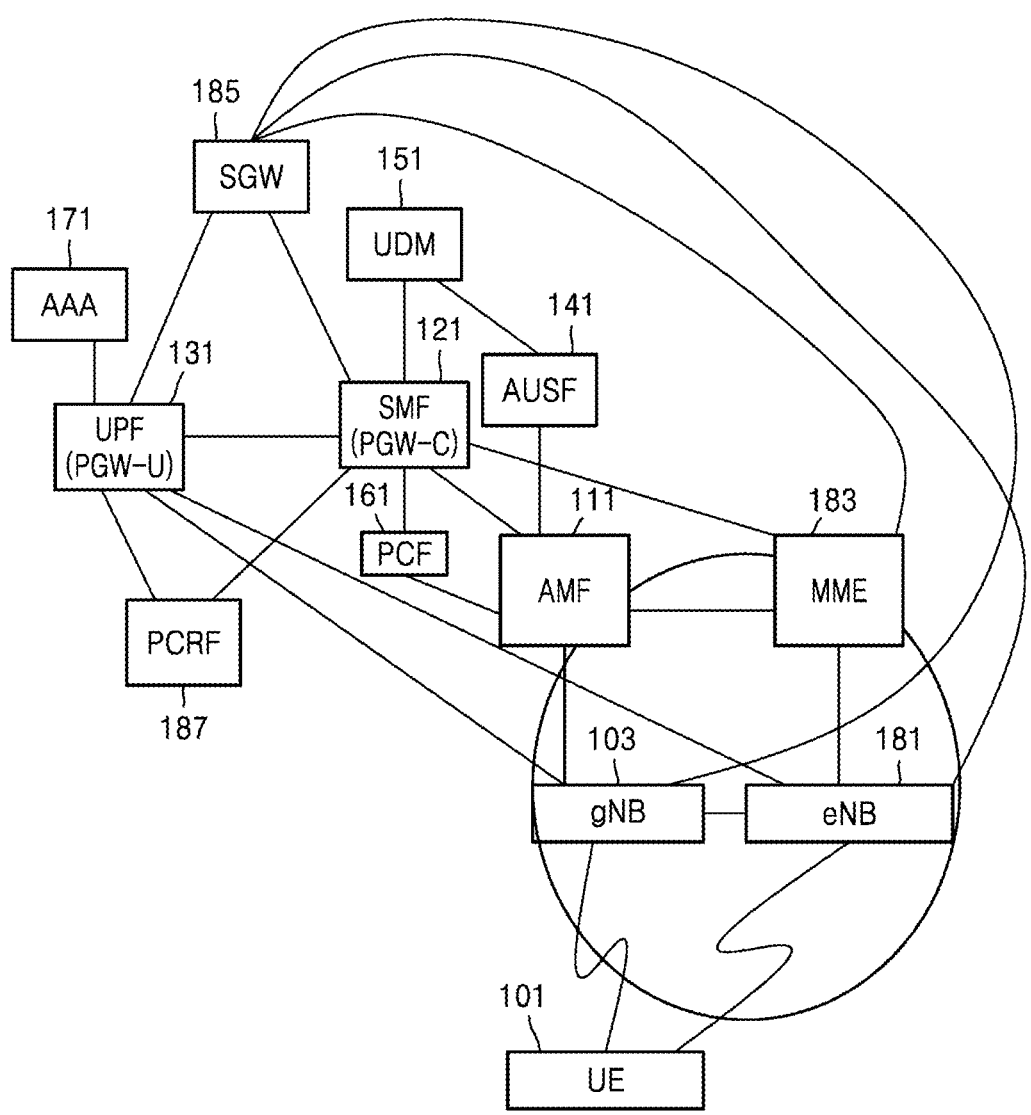
FIG. 1 illustrates a user equipment (UE) and a network environment for communication with enhanced security performance in a fourth- or fifth-generation (4G or 5G) network according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Embodiments of the disclosure will be described in detail with reference to accompanying drawings. Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification.

It will be understood that each blocks and combination of the blocks of a flowchart may be performed by computer program instructions.

Furthermore, each block may represent a part of a module, segment, or code including one or more executable instructions to perform particular logic function(s). It is noted that the functions described in the blocks may occur out of order in some alternative embodiments. For example, two blocks shown in succession may in fact be executed substantially concurrently or the blocks may sometimes be executed in the reverse order, depending upon the functionality involved.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

Herein, the terms to identify access nodes, the terms to refer to network entities or network functions, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

For convenience of explanation, the terms and names defined by the 3rd generation partnership project long term evolution (3GPP LTE) standard or their derivatives will be used hereinafter. The disclosure is not, however, limited to the terms and definitions, and may be equally applied to any systems that conform to other standards. In the disclosure, eNode B (eNB) may be interchangeably used with gNode B (gNB). For example, a base station referred to as an eNB may also indicate a gNB. The term "terminal" or "user equipment (UE)" may refer not only to a cell phone, a narrowband Internet of things (NB-IoT) device, and a sensor but also to various wireless communication devices.

Although embodiments of the disclosure will be primarily focused on communication standards defined by the 3GPP, the subject matter of the disclosure may also be applicable to other communication systems with a similar technical background with minor changes without significantly departing from the scope of the disclosure, which may be possible under the determination of those of ordinary skill in the art to which the disclosure pertains.

In the fifth-generation (5G) or new radio (NR) system, an access and mobility management function (AMF), a management entity that manages UE mobility, and a session management function (SMF), an entity that manages sessions are separated. For this reason, unlike the fourth-generation (4G) LTE communication system in which a mobility management entity (MME) performs both mobility management and session management, the mobility management and session management are performed by separate entities in the 5G or NR system, so a communication method and a communication management method between the UE and the network entity may be changed.

In the 5G or NR system, in order for a UE to access a network through non-3GPP access, mobility management may be performed by an AMF through a non-3GPP interworking function and session management may be performed by an SMF. Furthermore, the AMF may process security-related information, which is an important factor in the mobility management.

FIG. 1 illustrates a UE and a network environment for communication with enhanced security performance in a 4G or 5G network, according to an embodiment of the present disclosure.

Referring to FIG. 1, a 5G or NR core network may include network functions (NFs) such as a user plane function (UPF) 131, an SMF 121, an AMF 111, a 5G radio access network (RAN), e.g., gNB 103, a user data management (UDM) 151, a policy control function 161, and the like. Furthermore, to authenticate these entities, the 5G or NR core network may include entities such as an authentication server function (AUSF) 141, an authentication, authorization and accounting (AAA) 171, etc. Among the entities included in the 5G or NR core network, the UPF 131, the SMF 121, or the like may be connected to a policy and charging rule function (PCRF) 187. A UE or a terminal 101 may be connected to the 5G core network through a base station (BS) (also referred to as a gNB, a 5G RAN, or a RAN) 103. There may be an N3 interworking function (N3IWF) in case that the UE 101 performs communication through non-3GPP access, in which case session management may be controlled by the UE 101, the non-3GPP access, the N3IWF, and the SMF 121, and mobility management may be controlled by the UE 101, the non-3GPP access, the N3IWF, and the AMF 111.

As described above, in the 4G LTE system, a mobility management entity (MME) 183 is in charge of both mobility management and session management. The MME 183 may be connected to an eNB 181. The 5G or NR system may support a non-standalone architecture that performs communication in conjunction with a network entity of the 4G LTE system.

In the disclosure, in an environment where 4G LTE and 5G systems coexist, a method and apparatus for performing security-enhanced communication may be provided for the UE and the network to perform security management related to user data well.

There are separate entities to perform mobility management and session management, respectively, in the 5G or NR system. In the meantime, for the 5G or NR system, a standalone deployment structure that performs communication only with 5G or NR entities and a non-standalone deployment structure that uses both the 4G entity and the 5G or NR entities are taken into account.

As shown in FIG. 1, when the UE 101 communicates with the network, it is possible to have deployment in the form in which the eNB 181 is responsible for controlling and a 5G entity of a core network is used. In this case, mobility management between the UE 101 and the AMF 111 and session management between the UE 101 and the SMF 121 may be performed in a non-access stratum (NAS) layer, which is layer 3. In the meantime, access stratum (AS), layer 2, may be delivered between the UE 101 and the eNB 181.

Although the 5G or 4G LTE communication network is assumed as a communication network of the disclosure, embodiments of the disclosure may be equally applied to other systems in a scope that may be understood by those of ordinary skill in the art.

Figure 2:
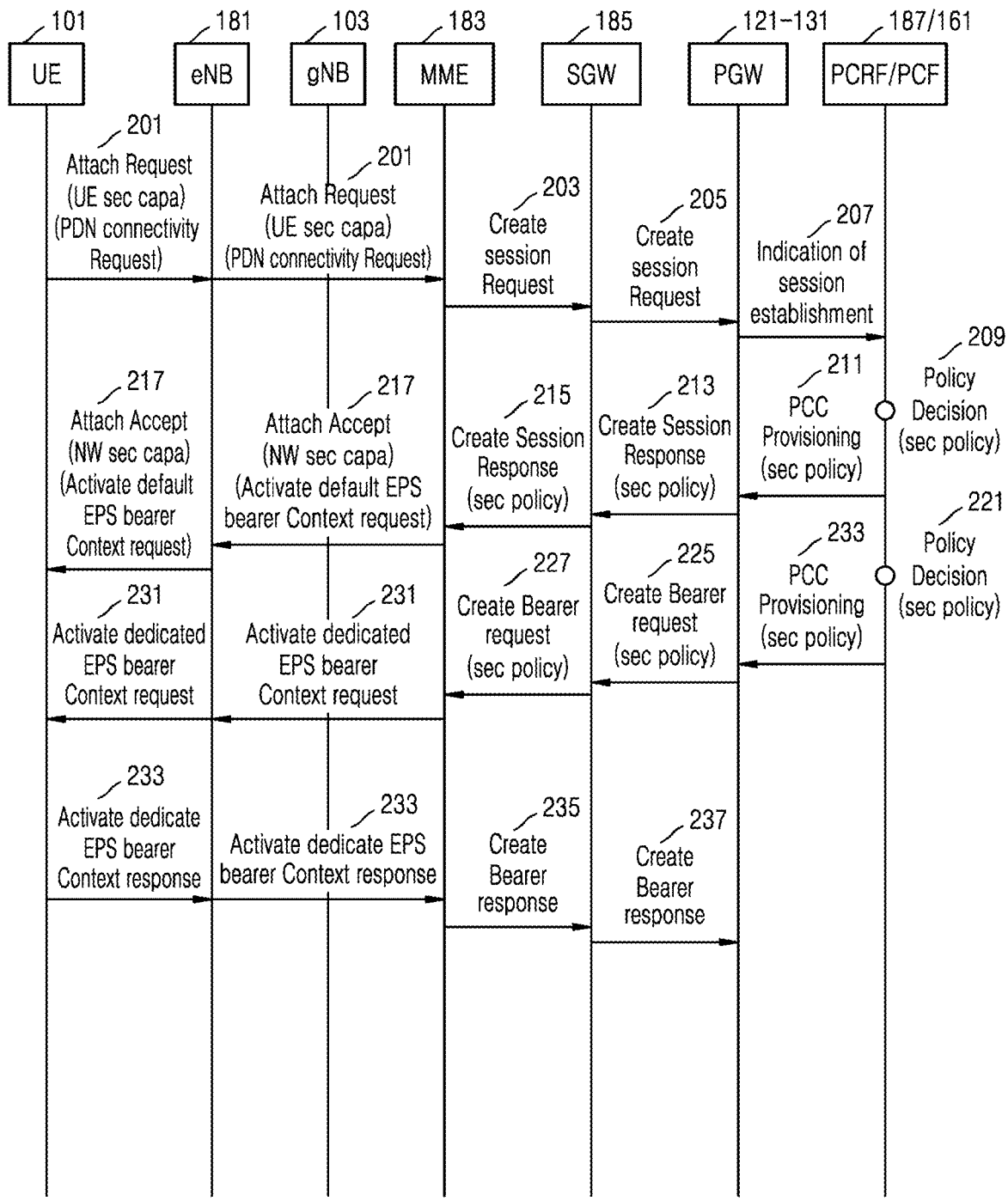
FIG. 2 illustrates a sequence chart for describing a procedure for performing security-enhanced communication using a non-access stratum (NAS) message in a 4G or 5G network environment according to an embodiment of the present disclosure.

FIG. 2 illustrates a sequence chart for describing a procedure for performing security-enhanced communication using a NAS message in a 4G or 5G network environment according to an embodiment of the present disclosure.

In operation 201, the UE 101 may send an attach request to the MME 183. The attach request message to be sent to the MME 183 from the UE 101 may be forwarded to the MME 183 through the eNB 181 from the UE 101. The attach request message may include a packet data network (PDN) connectivity request message. Specifically, the PDN connectivity request message may be transmitted by piggybacking on the attach request message.

The attach request message may include capability information about whether the UE 101 supports full rate data protection in LTE or even non-standalone optional 5G deployment.

The attach request message is as in Table 1 below.

The attach request message may include at least a piece of information about whether the UE 101 supports additional security protection, whether the UE 101 supports additional user plane integrity protection, whether the UE 101 supports a full data rate for user plane integrity protection, or whether the UE 101 has such supporting capabilities, and may be delivered to the network.

Case 1) Use of Additional Security Protection Parameter

In an embodiment of the disclosure, an additional security protection information element (IE), i.e., an additional security protection parameter, included and sent in the attach request message is a parameter to be sent from the UE 101 to the network. Information delivered by the additional security protection parameter indicates whether the UE has a capability to support user plane related security protection. Specifically, the information may indicate a UE capability regarding user plane security protection or user plane integrity protection or whether the UE is able to support the user plane integrity protection even at a full rate, or information regarding a maximum data rate that may be supported for the user plane integrity protection.

Case 2) Use of UE Security Capability Parameter

In another embodiment of the disclosure, information may be delivered from the UE to the network by using a UE security capability IE sent in the attach request message. The information delivered indicates whether the UE has capability to support user plane related security protection. Specifically, the information may indicate a UE capability regarding user plane security protection or user plane integrity protection, whether the UE is able to support the user plane integrity protection even at a full rate, or information regarding a maximum data rate that may be supported for the user plane integrity protection.

TABLE 1 attach request message

| IEI | Information Element | Type/Reference | Presence |
|---|---|---|---|
| | Protocol discriminator | Protocol discriminator | M |
| | Security header type | Security header type | M |
| | Attach request message identity | Message type | M |
| | EPS attach type | EPS attach type | M |
| | NAS key set identifier | NAS key set identifier | M |
| | EPS mobile identity | EPS mobile identity | M |
| | UE network capability | UE network capability | M |
| | ESM message container | ESM message container | M |
| | Old P-TMSI signature | P-TMSI signature | O |
| | Additional GUTI | EPS mobile identity | O |
| | Last visited registered TAI | Tracking area identity | O |
| | DRX parameter | DRX parameter | O |
| | MS network capability | MS network capability | O |
| | Old location area identification | Location area identification | O |
| | TMSI status | TMSI status | O |
| | Mobile station classmark 2 | Mobile station classmark 2 | O |
| | Mobile station classmark 3 | Mobile station classmark 3 | O |

TABLE 1-continued attach request message

| IEI | Information Element | Type/Reference | Presence |
|---|---|---|---|
| | Supported Codecs | Supported Codec List | O |
| | Additional update type | Additional update type | O |
| | Voice domain preference and UE's usage setting | Voice domain preference and UE's usage setting | O |
| | Device properties | Device properties | O |
| | Old GUTI type | GUTI type | O |
| | MS network feature support | MS network feature support | O |
| | TMSI based NRI container | Network resource identifier container | O |
| | T3324 value | GPRS timer 2 | O |
| | T3412 extended value | GPRS timer 3 | O |
| | Extended DRX parameters | Extended DRX parameters | O |
| | UE additional security capability | UE additional security capability | O |
| | UE Status | UE status | O |
| | Additional information requested | Additional information requested | O |
| | N1 UE network capability | N1 UE network capability | O |
| | UE radio capability ID availability | UE radio capability ID availability | O |
| | Requested WUS assistance information | WUS assistance information | O |
| | DRX parameter in NB-S1 mode | NB-SI DRX parameter | O |
| | Additional Security protection | | |

The PDN connectivity request message may include a security protection maximum data rate parameter.

The PDN connectivity request message may be defined as in Table 2 below.

TABLE 2

PDN connectivity request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | PDN connectivity request message identity | Message type | M |
| | Request type | Request type | M |
| | PDN type | PDN type | M |
| | ESM information transfer flag | ESM information transfer flag | O |
| | Access point name | Access point name | O |
| | Protocol configuration options | Protocol configuration options | O |
| | Device properties | Device properties | O |
| | NBIFOM container | NBIFOM container | O |
| | Header compression configuration | Header compression configuration | O |
| | Extended protocol configuration options | Extended protocol configuration options | O |
| | Security protection maximum data rate | | |

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. The information notified by the UE to the network may include 3) information about a maximum data rate for each UE used for security protection for the uplink, and 4) information about a maximum data rate for each UE used for security protection for the downlink.

In operation 203, the MME 183 may send a create session request message to a serving gateway (SGW) 185.

In operation 205, the SGW 185 may forward the create session request message to the PGW 121 or 131.

In operation 207, the PGW 121 or 131 may send a session establishment indication message to the PCRF 187/the PCF 161.

In operation 209, the PCRF 187/the PCF 161 may make a decision on a policy.

In operation 211, the PCRF 187/the PCF 161 may perform a role of delivering rate information for user plane integrity protection of the UE 101 and the network entities to the PGW 121 or 131. Furthermore, the PCRF 187/the PCF 161 may provision a policy and charging control (PCC) rule for the PGW 121 or 131.

The PCRF 187/the PCF 161 is an entity to do a role of delivering a quality of service (QoS) profile to be used by the UE 101 to the PGW 121 or 131. For example, a charging method (e.g., whether charging is performed offline, online, on a time basis, on a data volume basis, or the like) may be delivered. That is, a policy, QoS, and a charging method may be determined for each subscriber.

In addition thereto, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication between the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowed for each user based on the subscription or the operator's policy, a policy about whether the full data rate integrity protection is allowable, a data rate for integrity protection, etc.

In operation 213, the PGW 121 or 131 may send a create session response message to the SGW 185. The PGW 121 or 131 may create an evolved packet switched system (EPS) bearer (a GPRS tunneling protocol (GTP) tunnel) based on QoS information received from the PCRF 187/the PCF 161. The PGW 121 or 131 may deliver a QoS profile provided by the PCRF 187/the PCF 161 by sending the create session response message to the SGW 185.

Furthermore, the PGW 121 or 131 may perform a function related to delivering a security parameter and a security policy in association with data protection by sending the create session response message to the SWG 185.

Information relating to the security parameter and the security policy may be delivered to the PGW 121 or 131, the SGW 185, and the MIME 183 from the PCRF 187/the PCF 161. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then delivered to the MME 183 through the SGW 185. In this case, regarding data integrity protection, the information delivered may include information about whether the network is able to support user plane integrity protection, whether full data rate integrity protection is allowed for each user based on the subscription or the operator's policy, information about a policy about whether the full data rate integrity protection is allowable, a data rate for integrity protection, etc.

In an embodiment of the disclosure, regarding data integrity protection, the PGW 121 or 131 may deliver information about whether the network is able to support user plane integrity protection, whether a full data rate for user plane integrity protection may be supported, a user plane integrity protection data rate, etc.

In operation 215, the SGW 185 may forward the create session response message to the MME 183. Furthermore, the SGW 185 may perform a function related to delivering a security parameter and a security policy in association with data protection by sending the create session response message to the MME 183. Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowed for each user based on the subscription or the operator's policy, or information about a policy about whether the full data rate integrity protection is allowable, a data rate for integrity protection, etc.

In an embodiment of the disclosure, regarding data integrity protection, the SGW 185 may deliver information about whether user plane integrity protection that may be supported by the network is possible, whether a full data rate for user plane integrity protection may be supported, a user plane integrity protection data rate, etc.

In operation 217, the MME 183 may send an attach accept message to the UE 101. The attach accept message may be delivered to the UE 101 through the eNB 181. In this case, an activate default EPS bearer context request message may also be delivered by piggybacking on the attach accept message. In other words, the activate default EPS bearer context request message may be contained in the attach accept message.

The attach accept message may include information about whether the network is able to support full data rate security protection, full data integrity protection, etc., in association with data transmission.

TABLE 3 attach accept message

| IEI | Information Element | Type/Reference | Presence |
|---|---|---|---|
| | Protocol discriminator | Protocol discriminator | M |
| | Security header type | Security header type | M |
| | Attach accept message identity | Message type | M |
| | EPS attach result | EPS attach result | M |
| | Spare half octet | Spare half octet | M |
| | T3412 value | GPRS timer | M |
| | TAI list | Tracking area identity list | M |
| | ESM message container | ESM message container | M |
| | GUTI | EPS mobile identity | O |
| | Location area identification | Location area identification | O |
| | MS identity | Mobile identity | O |
| | EMM cause | EMM cause | O |
| | T3402 value | GPRS timer | O |

TABLE 3-continued

| | | attach accept message | |
|---|---|---|---|
| IEI | Information Element | Type/Reference | Presence |
| | T3423 value | GPRS timer | O |
| | Equivalent PLMNs | PLMN list | O |
| | Emergency number list | Emergency number list | O |
| | EPS network feature support | EPS network feature support | O |
| | Additional update result | Additional update result | O |
| | T3412 extended value | GPRS timer 3 | O |
| | T3324 value | GPRS timer 2 | O |
| | Extended DRX parameters | Extended DRX parameters | O |
| | DCN-ID | DCN-ID | O |
| | SMS services status | SMS services status | O |
| | Non-3GPP NW provided policies | Non-3GPP NW provided policies | O |
| | T3448 value | GPRS timer 2 | O |
| | Network policy | Network policy | O |
| | T3447 value | GPRS timer 3 | O |
| | Extended emergency number list | Extended emergency number list | O |
| | Ciphering key data | Ciphering key data | O |
| | UE radio capability ID | UE radio capability ID | O |
| | UE radio capability ID deletion indication | UE radio capability ID deletion indication | O |
| | Negotiated WUS assistance information | WUS assistance information | O |
| | Negotiated DRX parameter in NB-S1 mode | NB-S1 DRX parameter | O |
| | Network security capability | | |

The attach accept message is a message to be sent to the UE from the network, and information about network security capability may be transmitted in the attach accept message. A network security capability IE, i.e., a network security capability parameter, may include information about whether the network supports user plane integrity protection, whether the network supports an extended function of the security protection, maximum rate information of user plane integrity protection that may be supported by the network, etc.

In the meantime, through the activate default EPS bearer context request message, information about e.g., whether full data rate security protection or full rate data integrity protection is allowed by the network in association with bearer establishment, a data rate in association with integrity protection, etc., may be transmitted.

The activate default EPS bearer context request message may be defined as in Table 4 below.

In Table 4, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 4

| | activate default EPS bearer context request message | | |
|---|---|---|---|
| IEI | Information Element | Type/Reference | Presence |
| | Protocol discriminator | Protocol discriminator | M |
| | EPS bearer identity | EPS bearer identity | M |
| | Procedure transaction identity | Procedure transaction identity | M |
| | Activate default EPS bearer context request message identity | Message type | M |
| | EPS QoS | EPS quality of service | M |
| | Access point name | Access point name | M |
| | PDN address | PDN address | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | APN-AMBR | APN aggregate maximum bit rate | O |
| | ESM cause | ESM cause | O |
| | Protocol configuration options | Protocol configuration options | O |
| | Connectivity type | Connectivity type | O |
| | WLAN offload indication | WLAN offload acceptability | O |

TABLE 4-continued activate default EPS bearer context request message

| IEI | Information Element | Type/Reference | Presence |
|---|---|---|---|
| | NBIFOM container | NBIFOM container | O |
| | Header compression configuration | Header compression configuration | O |
| | Control plane only indication | Control plane only indication | O |
| | Extended protocol configuration options | Extended protocol configuration options | O |
| | Serving PLMN rate control | Serving PLMN rate control | O |
| | Extended APN-AMBR | Extended APN aggregate maximum bit rate | O |
| | Allowed security support maximum data rate | Allowed security support maximum data rate | O |
| | Allowed security support data rate | Allowed security support data rate | O |

In operation 221, the PCRF 187/the PCF 161 may make a decision on a policy.

In operation 223, the PCRF 187/the PCF 161 may deliver rate information for user plane integrity protection for the UE 101 and network entities to the PGW 121 or 131. Furthermore, the PCRF 187/the PCF 161 may provision a PCC rule for the PGW 121 or 131.

The PCRF 187/THE PCF 161 is an entity to do a role of delivering a QoS profile to be usually used by the UE 101 to the PGW 121 or 131. For example, information about a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 225, the PGW 121 or 131 may send a create bearer request message to the SGW 185.

The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create bearer request message to the SGW 185.

Furthermore, the PGW 121 or 131 may perform a function related to delivering a security parameter and a security policy in association with data protection by sending the create bearer request message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 227, the SGW 185 may send a create bearer request message to the MME 183.

Furthermore, the SGW 185 may perform a function related to delivering a security parameter and a security policy in association with data protection by sending the create bearer request message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether the network is able to support user plane integrity protection, whether a full data rate for user plane integrity protection may be supported, a user plane integrity protection data rate, etc.

In operation 231, the MME 183 sends an activate dedicated EPS bearer context request message to the UE 101. The activate dedicated EPS bearer context request message may be delivered to the UE 101 through the eNB 181.

In the meantime, the activate dedicated EPS bearer context request message may include information about e.g., whether full data rate security protection is allowed by the network in association with bearer establishment or data rate information related to integrity protection.

The activate dedicated EPS bearer context request message may be defined as in Table 5 below.

In Table 5, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

the MME 183 from the UE 101 may be forwarded to the MME 183 through the eNB 181 from the UE 101. The attach request message may include a PDN connectivity request message. Specifically, the PDN connectivity request message may be transmitted by piggybacking on the attach request message.

The attach request message may include capability information about whether the UE 101 supports full rate data protection in LTE or even non-standalone optional 5G deployment.

The attach request message is as in Table 6 below.

The attach request message may include, as shown in Table 6, at least a piece of information about whether to support additional security protection, whether to support additional user plane integrity protection, whether the UE 101 supports a full data rate for user plane integrity protection, or whether the UE 101 has such supporting capability, and may be delivered to the network.

Case 1) Use of Additional Security Protection Parameter

In an embodiment of the disclosure, an additional security protection IE, i.e., an additional security protection parameter, included and sent in the attach request message is a parameter to be sent from the UE 101 to the network. Information delivered by the additional security protection parameter indicates whether the UE has capability to support user plane related security protection. Specifically, the information may indicate a UE capability regarding user plane security protection or user plane integrity protection or

TABLE 5 activate dedicated EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate dedicated EPS bearer context request message identity | Message type | M |
| | Linked EPS bearer identity | Linked EPS bearer identity | M |
| | Spare half octet | Spare half octet | M |
| | EPS QoS | EPS quality of service | M |
| | TFT | Traffic flow template | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | Protocol configuration options | Protocol configuration options | O |
| | WLAN offload indication | WLAN offload acceptability | O |
| | NBIFOM container | NBIFOM container | O |
| | Extended protocol configuration options | Extended protocol configuration options | O |
| | Extended EPS QoS | Extended quality of service | O |
| | Allowed security maximum data rate | Allowed security maximum data rate | O |
| | Allowed security support data rate | Allowed security support data rate | O |

In operation 233, the UE 101 may send an activate dedicated EPS bearer context response message to the MME 183. The activate dedicated EPS bearer context response message may be delivered from the UE 101 to the MME 183 through the eNB 181.

In operation 235, the MME 183 may send a create bearer response message to the SGW 185.

In operation 237, the SGW 185 may forward the create bearer response message to the PGW 121 or 131.

Figure 3:
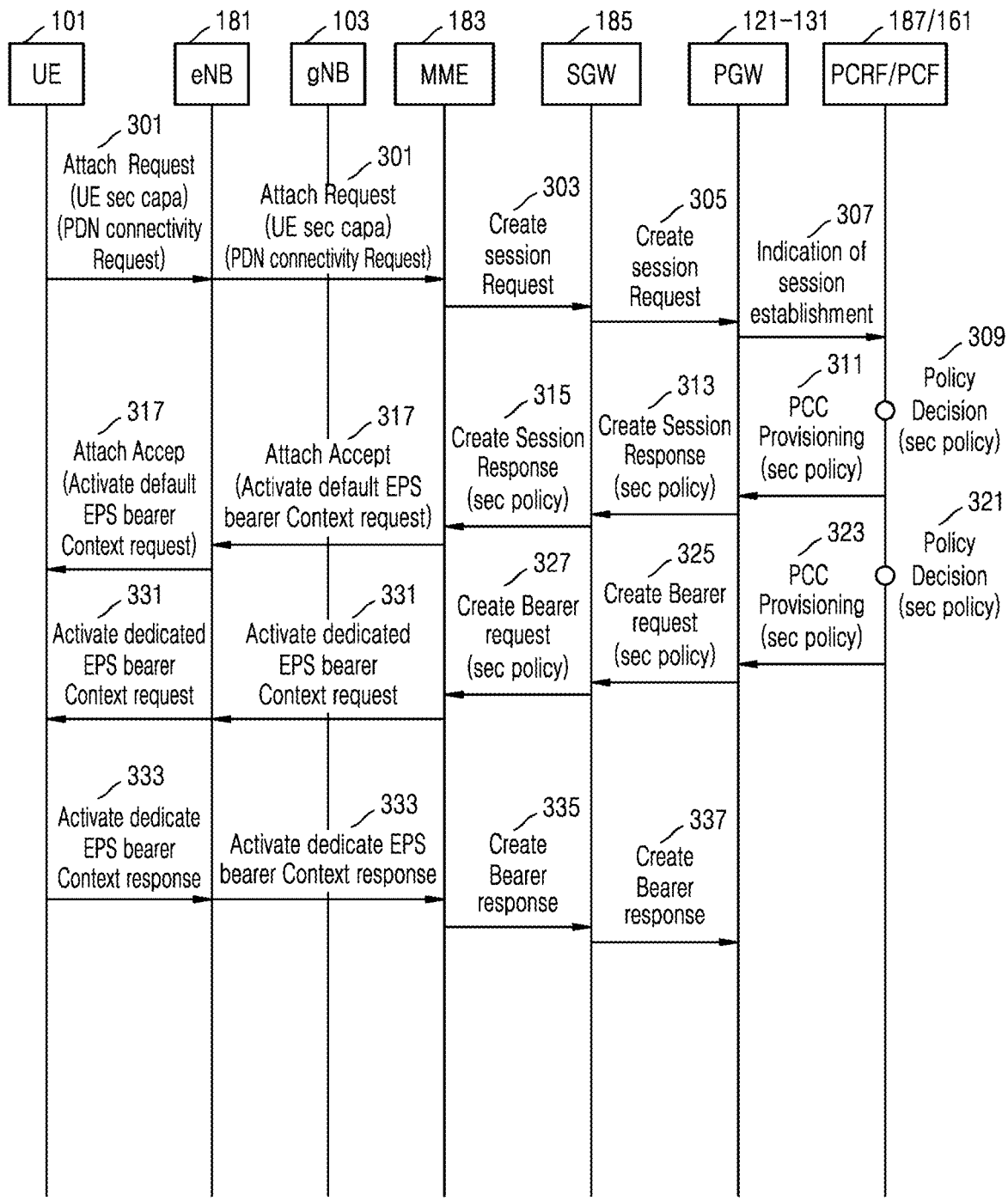
FIG. 3 illustrates a sequence chart for describing a procedure for performing security-enhanced communication using a NAS message in a 4G or 5G network environment according to an embodiment of the present disclosure.

FIG. 3 illustrates a sequence chart for describing a procedure for performing security-enhanced communication using a NAS message in a 4G or 5G network environment, according to an embodiment of the present disclosure.

In operation 301, the UE 101 may send an attach request to the MME 183. The attach request message to be sent to whether the UE is able to support the user plane integrity protection even at a full rate, or information regarding a maximum data rate that may be supported for the user plane integrity protection.

Case 2) Use of UE Security Capability Parameter

In another embodiment of the disclosure, information may be delivered from the UE to the network by using a UE security capability IE sent in the attach request message. The information delivered indicates whether the UE has capability to support user plane related security protection. Specifically, the information may indicate a UE capability regarding support user plane security protection or user plane integrity protection or whether the UE is able to support the user plane integrity protection even at a full rate, or information regarding a maximum data rate that may be supported for the user plane integrity protection.

TABLE 6 attach request message

| IEI | Information Element | Type/Reference | Presence |
|---|---|---|---|
| | Protocol discriminator | Protocol discriminator | M |
| | Security header type | Security header type | M |
| | Attach request message identity | Message type | M |
| | EPS attach type | EPS attach type | M |
| | NAS key set identifier | NAS key set identifier | M |
| | EPS mobile identity | EPS mobile identity | M |
| | UE network capability | UE network capability | M |
| | ESM message container | ESM messags container | M |
| | Old P-TMSI signature | P-TMSI signature | O |
| | Additional GUTI | EPS mobile identity | O |
| | Last visited registered TAI | Tracking area identity | O |
| | DRX parameter | DRX parameter | O |
| | MS network capability | MS network capability | O |
| | Old location area identification | Location area identification | O |
| | TMSI status | TMSI status | O |
| | Mobile station classmark 2 | Mobile station classmark 2 | O |
| | Mobile station classmark 3 | Mobile station classmark 3 | O |
| | Supported Codecs | Supported Codec List | O |
| | Additional update type | Additional update type | O |
| | Voice domain preference and UE's usage setting | Voice domain preference and UE's usage setting | O |
| | Device properties | Device properties | O |
| | Old GUTI type | GUTI type | O |
| | MS network feature support | MS network feature support | O |
| | TMSI based NRI container | Network resource identifier container | O |
| | T3324 value | GPRS timer 2 | O |
| | T3412 extended value | GPRS timer 3 | O |
| | Extended DRX parameters | Extended DRX parameters | O |
| | UE additional security capability | UE additional security capability | O |
| | UE status | UE status | O |
| | Additional information requested | Additional information requested | O |
| | N1 UE network capability | N1 UE network capability | O |
| | UE radio capability ID availability | UE radio capability ID availability | O |
| | Requested WUS assistance information | WUS assistance information | O |
| | DRX parameter in NB-S1 mode | NB-S1 DRX parameter | O |
| | Additional Security protection | | |

The PDN connectivity request message may include a security protection maximum data rate parameter.

The PDN connectivity request message may be defined as in Table 7 below.

TABLE 7

PDN connectivity request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | PDN connectivity request message identity | Message type | M |
| | Request type | Request type | M |
| | PDN type | PDN type | M |
| | ESM information transfer flag | ESM information transfer flag | O |
| | Access point name | Access point name | O |
| | Protocol configuration options | Protocol configuration options | O |
| | Device properties | Device properties | O |
| | NBIFOM container | NBIFOM container | O |
| | Header compression configuration | Header compression configuration | O |
| | Extended protocol configuration options | Extended protocol configuration options | O |
| | Security protection maximum data rate | | |

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. Or the information notified by the UE to the network may include 3) information about a maximum data rate for each UE used for security protection for the uplink, and 4) information about a maximum data rate for each UE used for security protection for the downlink.

In operation 303, the MME 183 may send a create session request message to the SGW 185.

In operation 305, the SGW 185 may forward the create session request message to the PGW 121 or 131.

In operation 307, the PGW 121 or 131 may send a session establishment indication message to the PCRF 187/the PCF 161.

In operation 309, the PCRF 187/the PCF 161 may make a decision on a policy.

In operation 311, the PCRF 187/the PCF 161 may perform a role of delivering rate information for user plane integrity protection of the UE 101 and the network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication between the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 313, the PGW 121 or 131 may send a create session response message to the SGW 185. The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create session response message to the SGW 185.

Furthermore, the PGW 121 or 131 may perform a function related to delivering a security parameter and a security policy in association with data protection by sending the create session response message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then delivered to the MME 183 through the SGW 185.

In this case, regarding data integrity protection, the information delivered may include information about whether the network is able to support user plane integrity protection, whether full data rate integrity protection for each user is allowable based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether the network is able to support user plane integrity protection, whether a full data rate for user plane integrity protection may be supported, a user plane integrity protection data rate, etc.

In operation 315, the SGW 185 may forward the create session response message to the MME 183. Furthermore, the SGW 185 may perform a function related to delivering a security parameter and a security policy in association with data protection by sending the create session response message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection for each user is allowable based on the subscription or the operator's policy, a policy about whether the full data rate integrity protection is allowable, a data rate for integrity protection, etc.

In an embodiment of the disclosure, regarding data integrity protection, the SGW 185 may deliver information about whether user plane integrity protection that may be supported by the network is possible, whether a full data rate for user plane integrity protection may be supported, a user plane integrity protection data rate, etc.

In operation 317, the MME 183 may send an attach accept message to the UE 101. The attach accept message may be delivered to the UE 101 from the MME 183 through the eNB 181. In this case, an activate default EPS bearer context request message may also be delivered by piggybacking on the attach accept message. In other words, the activate default EPS bearer context request message may be contained in the attach accept message.

In the meantime, through the activate default EPS bearer context request message, information about e.g., whether full data rate security protection or full rate data integrity protection is allowed by the network in association with bearer establishment, a data rate in association with integrity protection, etc., may be transmitted.

The activate default EPS bearer context request message may be defined as in Table 8 below.

In Table 8, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 8 activate default EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate default EPS bearer context request message identity | Message type | M |
| | EPS QoS | EPS quality of service | M |
| | Access point name | Access point name | M |
| | PDN address | PDN address | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | APN-AMBR | APN aggregate maximum bit rate | O |
| | ESM cause | ESM cause | O |
| | Protocol configuration options | Protocol configuration options | O |
| | Connectivity type | Connectivity type | O |
| | WLAN offload indication | WLAN offload acceptability | O |
| | NBIFOM container | NBIFOM container | O |
| | Header compression configuration | Header compression configuration | O |
| | Control plane only indication | Control plane only indication | O |
| | Extended protocol configuration options | Extended protocol configuration options | O |
| | Serving PLMN rate control | Serving PLMN rate control | O |
| | Extended APN-AMBR | Extended APN aggregate maximum bit rate | O |
| | Allowed security support maximum data rate | Allowed security support maximum data rate | O |
| | Allowed security support data rate | Allowed security support data rate | O |

In operation 321, the PCRF 187/the PCF 161 may make a decision on a policy.

In operation 323, the PCRF 187/the PCF 161 may deliver rate information for user plane integrity protection for the UE 101 and network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, information about a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 325, the PGW 121 or 131 may send a create bearer request message to the SGW 185.

The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create bearer request message to the SGW 185.

Furthermore, the PGW 121 or 131 may perform a function related to delivering a security parameter and a security policy in association with data protection by sending the create bearer request message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 327, the SGW 185 may send a create bearer request message to the MME 183.

Furthermore, the SGW 185 may perform a function related to delivering a security parameter and a security policy in association with data protection by sending the create bearer request message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection for each user is allowable based on the subscription or the operator's policy, a policy about whether the full data rate integrity protection is allowable, a data rate for integrity protection, etc.

In an embodiment of the disclosure, regarding data integrity protection, the SGW 185 may deliver information about whether the network is able to support user plane integrity protection, whether a full data rate for user plane integrity protection may be supported, a user plane integrity protection data rate, etc.

In operation 331, the MME 183 sends an activate dedicated EPS bearer context request message to the UE 101. The activate dedicated EPS bearer context request message may be delivered to the UE 101 from the MME 183 through the eNB 181.

In the meantime, the activate dedicated EPS bearer context request message may include information about e.g., whether full data rate security protection is allowed by the network in association with bearer establishment or data rate information related to integrity protection.

The activate dedicated EPS bearer context request message may be defined as in Table 9 below.

In Table 9, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 9 activate dedicated EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate dedicated EPS bearer context request message identity | Message type | M |
| | Linked EPS bearer identity | Linked EPS bearer identity | M |
| | Spare half octet | Spare half octet | M |
| | EPS QoS | EPS quality of service | M |
| | TFT | Traffic flow template | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | Protocol configuration options | Protocol configuration options | O |
| | WLAN offload indication | WLAN offload acceptability | O |
| | NBIFOM container | NBIFOM container | O |
| | Extended protocol configuration options | Extended protocol configuration options | O |
| | Extended EPS QoS | Extended quality of service | O |
| | Allowed security maximum data rate | Allowed security maximum data rate | O |
| | Allowed security support data rate | Allowed security support data rate | O |

In operation 333, the UE 101 may send an activate dedicated EPS bearer context response message to the MME 183. The activate dedicated EPS bearer context response message may be delivered from the UE 101 to the MME 183 through the eNB 181.

In operation 335, the MME 183 may send a create bearer response message to the SGW 185.

In operation 337, the SGW 185 may forward the create bearer response message to the PGW 121 or 131.

Figure 4:
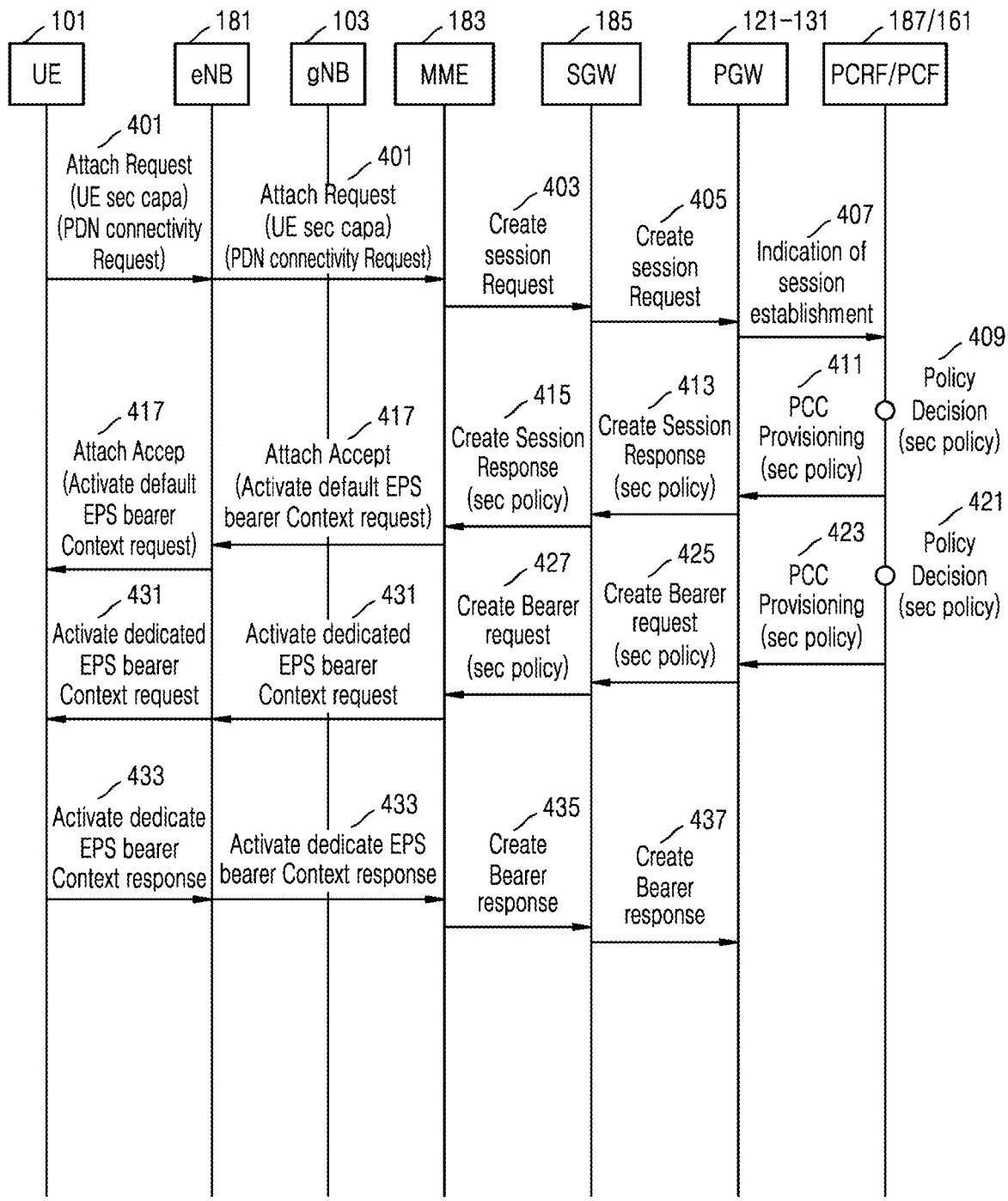
FIG. 4 illustrates a sequence chart for describing a procedure for performing security-enhanced communication using a NAS message in a 4G or 5G network environment according to an embodiment of the present disclosure.

FIG. 4 illustrates a sequence chart for describing a procedure for performing security-enhanced communication using a NAS message in a 4G or 5G network environment, according to an embodiment of the present disclosure.

In operation 401, the UE 101 may send an attach request to the MME 183. The attach request message to be sent to the MME 183 from the UE 101 may be forwarded to the MME 183 through the eNB 181 from the UE 101. The attach request message may include a PDN connectivity request message. Specifically, the PDN connectivity request message may be transmitted by piggybacking on the attach request message.

The PDN connectivity request message may include a security protection maximum data rate parameter.

The PDN connectivity request message may be defined as in Table 10 below.

TABLE 10

| | PDN connectivity request message | | |
|---|---|---|---|
| IEI | Information Element | Type/Reference | Presence |
| | Protocol discriminator | Protocol discriminator | M |
| | EPS bearer identity | EPS bearer identity | M |
| | Procedure transaction identity | Procedure transaction identity | M |
| | PDN connectivity request message identity | Message type | M |
| | Request type | Request type | M |
| | PDN type | PDN type | M |
| | ESM information transfer flag | ESM information transfer flag | O |
| | Access point name | Access point name | O |
| | Protocol configuration options | Protocol configuration options | O |
| | Device properties | Device properties | O |
| | NBIFOM container | NBIFOM container | O |
| | Header compression configuration | Header compression configuration | O |
| | Extended protocol configuration options | Extended protocol configuration options | O |
| | Security protection maximum data rate | | |

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. The information notified by the UE to the network may include 3) information about a maximum data rate for each UE used for security protection for the uplink, and 4) information about a maximum data rate for each UE used for security protection for the downlink.

In operation 403, the MME 183 may send a create session request message to the SGW 185.

In operation 405, the SGW 185 may forward the create session request message to the PGW 121 or 131.

In operation 407, the PGW 121 or 131 may send a session establishment indication message to the PCRF 187/the PCF 161.

In operation 409, the PCRF 187/the PCF 161 may make a decision on a policy.

In operation 411, the PCRF 187/the PCF 161 may perform a role of delivering rate information for user plane integrity protection of the UE 101 and the network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication between the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowed for each user based on the subscription or the operator's policy, a policy about whether the full data rate integrity protection is allowable, a data rate for integrity protection, etc.

In operation 413, the PGW 121 or 131 may send a create session response message to the SGW 185. The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create session response message to the SGW 185.

Furthermore, the PGW 121 or 131 may perform a function related to delivering a security parameter and a security policy in association with data protection by sending the create session response message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then delivered to the MME 183 through the SGW 185.

In this case, regarding data integrity protection, the information delivered may indicate whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 415, the SGW 185 may forward the create session response message to the MME 183.

Furthermore, the SGW 185 may perform a function related to delivering a security parameter and a security policy in association with data protection by sending the create session response message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MIME 183 through the SGW 185.

In this case, regarding data integrity protection, the information delivered may include information about whether the network is able to support user plane integrity protection, whether full data rate integrity protection for each user is allowable based on the subscription or the operator's policy, a policy about whether the full data rate integrity protection is allowable, a data rate for integrity protection, etc.

In an embodiment of the disclosure, regarding data integrity protection, the SGW 185 may deliver information about whether user plane integrity protection that may be supported by the network is possible, whether a full data rate for user plane integrity protection may be supported, a user plane integrity protection data rate, etc.

In operation 417, the MME 183 may send an attach accept message to the UE 101. The attach accept message may be delivered to the UE 101 from the MME 183 through the eNB 181. In this case, an activate default EPS bearer context request message may also be delivered by piggybacking on the attach accept message. In other words, the activate default EPS bearer context request message may be contained in the attach accept message.

The attach accept message is a message to be sent to the UE from the network, and information about network security capability may be transmitted in the attach accept message. A network security capability IE, i.e., a network security capability parameter, may include information about whether the network supports user plane integrity protection, whether the network supports an extended function of the security protection, maximum rate information of user plane integrity protection that may be supported by the network, etc.

In the meantime, through the activate default EPS bearer context request message, information about e.g., whether full data rate security protection or full rate data integrity protection is allowed by the network in association with bearer establishment, a data rate in association with integrity protection, etc., may be transmitted.

The activate default EPS bearer context request message may be defined as in Table 11 below.

In Table 11, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 11

| | activate default EPS bearer context request message | | |
|---|---|---|---|
| IEI | Information Element | Type/Reference | Presence |
| | Protocol discriminator | Protocol discriminator | M |
| | EPS bearer identity | EPS bearer identity | M |
| | Procedure transaction identity | Procedure transaction identity | M |
| | Activate default EPS bearer context request message identity | Message type | M |
| | EPS QoS | EPS quality of service | M |
| | Access point name | Access point name | M |
| | PDN address | PDN address | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | APN-AMBR | APN aggregate maximum bit rate | O |
| | ESM cause | ESM cause | O |

TABLE 11-continued activate default EPS bearer context request message

| IEI | Information Element | Type/Reference | Presence |
|---|---|---|---|
| | Protocol configuration options | Protocol configuration options | O |
| | Connectivity type | Connectivity type | O |
| | WLAN offload indication | WLAN offload acceptability | O |
| | NBIFOM container | NBIFOM container | O |
| | Header compression configuration | Header compression configuration | O |
| | Control plane only indication | Control plane only indication | O |
| | Extended protocol canfiguration options | Extended protacol configuration options | O |
| | Serving PLMN rate control | Serving PLMN rate control | O |
| | Extended APN-AMBR | Extended APN aggregate maximum bit rate | O |
| | Allowed security support maximum data rate | Allowed security support maximum data rate | O |
| | Allowed security support data rate | Allowed security support data rate | O |

In operation 421, the PCRF 187/the PCF 161 may make a decision on a policy.

In operation 423, the PCRF 187/the PCF 161 may deliver rate information for user plane integrity protection for the UE 101 and network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, information about a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 425, the PGW 121 or 131 may send a create bearer request message to the SGW 185.

The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create bearer request message to the SGW 185.

Furthermore, the PGW 121 or 131 may perform a function related to delivering a security parameter and a security policy in association with data protection by sending the create bearer request message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 427, the SGW 185 may send a create bearer request message to the MME 183.

Furthermore, the SGW 185 may perform a function related to delivering a security parameter and a security policy in association with data protection by sending the create bearer request message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether the network is able to support user plane integrity protection, whether a full data rate for user plane integrity protection may be supported, a user plane integrity protection data rate, etc.

In operation 431, the MME 183 sends an activate dedicated EPS bearer context request message to the UE 101. The activate dedicated EPS bearer context request message may be delivered to the UE 101 from the MME 183 through the eNB 181.

In the meantime, the activate dedicated EPS bearer context request message may include information about e.g., whether full data rate security protection is allowed by the network in association with bearer establishment or data rate information related to integrity protection.

The activate dedicated EPS bearer context request message may be defined as in Table 12 below.

In Table 12, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

In operation 435, the MME 183 may send a create bearer response message to the SGW 185.

In operation 437, the SGW 185 may forward the create bearer response message to the PGW 121 or 131.

Figure 5:
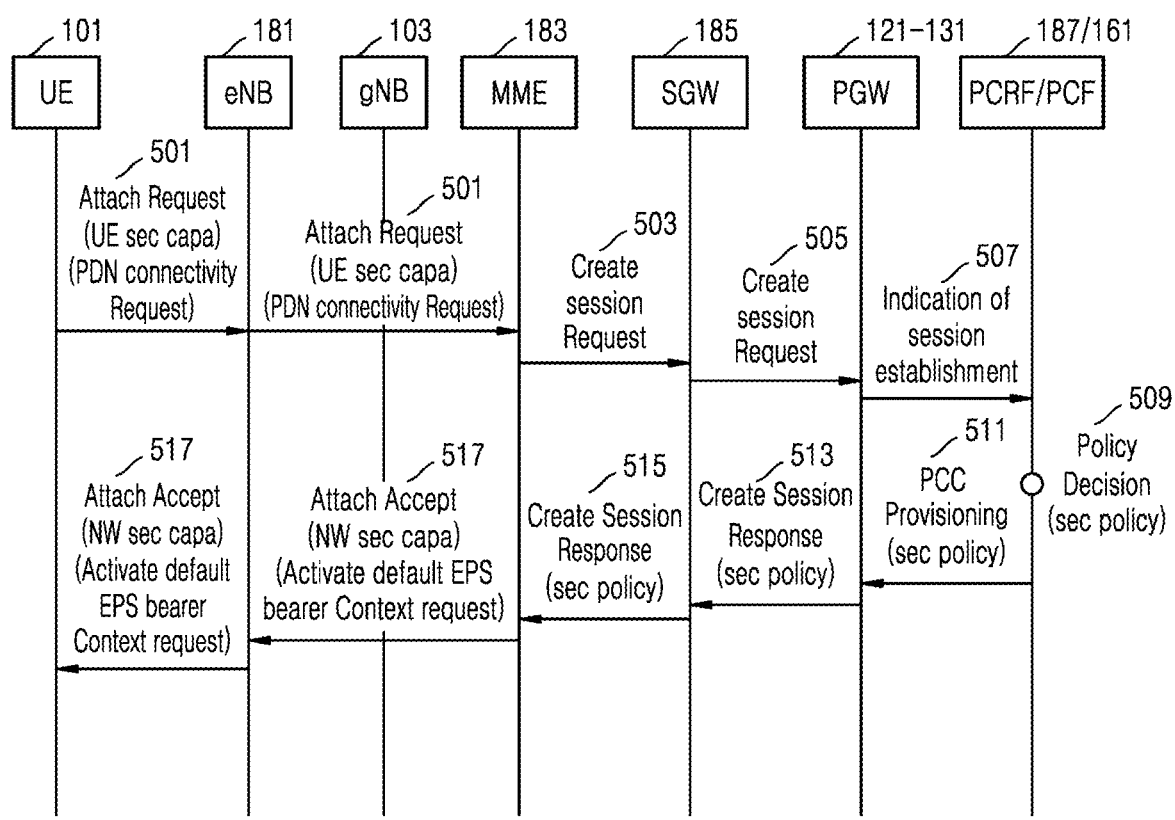
FIG. 5 illustrates a sequence chart for describing a procedure for performing security-enhanced communication using a NAS message in a 4G or 5G network environment according to an embodiment of the present disclosure.

FIG. 5 illustrates a sequence chart for describing a procedure for performing security-enhanced communication using a NAS message in a 4G or 5G network environment according to an embodiment of the present disclosure.

In operation 501, the UE 101 may send an attach request to the MME 183. The attach request message to be sent to the MME 183 from the UE 101 may be forwarded to the MME 183 through the eNB 181 from the UE 101. The attach request message may include a PDN connectivity request message. Specifically, the PDN connectivity request message may be transmitted by piggybacking on the attach request message.

The attach request message may include capability information about whether the UE 101 supports full rate data protection in LTE or non-standalone optional 5G deployment.

The attach request message is as in Table 13 below.

The attach request message may include, as shown in Table 13, at least a piece of information about whether to support additional security protection, whether to support additional user plane integrity protection, whether the UE 101 supports a full data rate for user plane integrity protection, or whether the UE 101 has such supporting capability, and may be delivered to the network.

Case 1) Use of Additional Security Protection Parameter

In an embodiment, an additional security protection IE, i.e., an additional security protection parameter, included and sent in the attach request message is a parameter to be sent from the UE 101 to the network. Information delivered by the additional security protection parameter indicates

TABLE 12 activate dedicated EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate dedicated EPS bearer context request message identity | Message type | M |
| | Linked EPS bearer identity | Linked EPS bearer identity | M |
| | Spare half octet | Spare half octet | M |
| | EPS QoS | EPS quality of service | M |
| | TFT | Traffic flow template | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | Protocol configuration options | Protocol configuration options | O |
| | WLAN offload indication | WLAN offload acceptability | O |
| | NBIFOM container | NBIFOM container | O |
| | Extended protocol configuration options | Extended protocol configuration options | O |
| | Extended EPS QoS | Extended quality of service | O |
| | Allowed security maximum data rate | Allowed security maximum data rate | O |
| | Allowed security support data rate | Allowed security support data rate | O |

In operation 433, the UE 101 may send an activate dedicated EPS bearer context response message to the MME 183. The activate dedicated EPS bearer context response message may be delivered from the UE 101 to the MME 183 through the eNB 181.

whether the UE has capability to support user plane related security protection. Specifically, the information may indicate a UE capability regarding user plane security protection or user plane integrity protection or whether the UE is able to support the user plane integrity protection even at a full rate, or information regarding a maximum data rate that may be supported for the user plane integrity protection.

Case 2) Use of UE Security Capability Parameter

In another embodiment of the disclosure, information may be delivered from the UE to the network by using a UE security capability IE sent in the attach request message. The information delivered indicates whether the UE has capability to support user plane related security protection. Specifically, the information may indicate a UE capability regarding user plane security protection or user plane integrity protection or whether the UE is able to support the user plane integrity protection even at a full rate, or information regarding a maximum data rate that may be supported for the user plane integrity protection.

TABLE 13 attach request message

| IEI | Information Element | Type/Reference | Presence |
|---|---|---|---|
| | Protocol discriminator | Protocol discriminator | M |
| | Security header type | Security header type | M |
| | Attach request message identity | Message type | M |
| | EPS attach type | EPS attach tyne | M |
| | NAS key set identifier | NAS key set identifier | M |
| | EPS mobile identity | EPS mobile identity | M |
| | UE network capability | UE network capability | M |
| | ESM message container | ESM message container | M |
| | Old P-TMSI signature | P-TMSI signature | O |
| | Additional GUTI | EPS mobile identity | O |
| | Last visited registered TAI | Tracking area identity | O |
| | DRX parameter | DRX parameter | O |
| | MS network capability | MS network capability | O |
| | Old location area identification | Location area identification | O |
| | TMSI status | TMSI status | O |
| | Mobile station classmark 2 | Mobile station classmark 2 | O |
| | Mobile station classmark 3 | Mobile station classmark 3 | O |
| | Supported Codecs | Supported Codec List | O |
| | Additional update type | Additional update type | O |
| | Voice domain preference and UE's usage setting | Voice domain preference and UE's usage setting | O |
| | Devics properties | Device properties | O |
| | Old GUTI type | GUTI type | O |
| | MS network feature support | MS network feature support | O |
| | TMSI based NRI container | Network resource identifier container | O |
| | T3324 vaiue | GPRS timer 2 | O |
| | T3412 extended value | GPRS timer 3 | O |
| | Extended DRX parameters | Extended DRX parameters | O |
| | UE additional security capability | UE additional security capability | O |
| | UE status | UE status | O |
| | Additional information requested | Additional information requested | O |
| | N1 UE network capability | N1 UE network capability | O |
| | UE radio capability ID availability | UE radio capability ID availability | O |
| | Requested WUS assistance information | WUS assistance information | O |
| | DRX parameter in NB-S1 mode | NB-S1 DRX parameter | O |
| | Additional Security protection | | |

The PDN connectivity request message may include a security protection maximum data rate parameter.

The PDN connectivity request message may be defined as in Table 14 below.

TABLE 14

PDN connectivity request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | PDN connectivity request message identity | Message type | M |
| | Request type | Request type | M |
| | PDN type | PDN type | M |

TABLE 14-continued

<table>
<tr><td colspan="4">PDN connectivity request message</td></tr>
<tr><td>IEI</td><td>Information Element</td><td>Type/Reference</td><td>Presence</td></tr>
<tr><td></td><td>ESM information transfer flag</td><td>ESM information transfer flag</td><td>O</td></tr>
<tr><td></td><td>Access point name</td><td>Access point name</td><td>O</td></tr>
<tr><td></td><td>Protocol configuration options</td><td>Protocol configuration options</td><td>O</td></tr>
<tr><td></td><td>Device properties</td><td>Device properties</td><td>O</td></tr>
<tr><td></td><td>NBIFOM container</td><td>NBIFOM container</td><td>O</td></tr>
<tr><td></td><td>Header compression configuration</td><td>Header compression configuration</td><td>O</td></tr>
<tr><td></td><td>Extended protocol configuration options<br>Security protection maximum data rate</td><td>Extended protocol configuration options</td><td>O</td></tr>
</table>

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. The information notified by the UE to the network may include 3) information about a maximum data rate for each UE used for security protection for the uplink, and 4) information about a maximum data rate for each UE used for security protection for the downlink.

In operation 503, the MME 183 may send a create session request message to the SGW 185.

In operation 505, the SGW 185 may forward the create session request message to the PGW 121 or 131.

In operation 507, the PGW 121 or 131 may send a session establishment indication message to the PCRF 187/the PCF 161.

In operation 509, the PCRF 187/the PCF 161 may make a decision on a policy.

In operation 511, the PCRF 187/the PCF 161 may perform a role of delivering rate information for user plane integrity protection of the UE 101 and the network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowed for each user based on the subscription or the operator's policy, a policy about whether the full data rate integrity protection is allowable, a data rate for integrity protection, etc.

In operation 513, the PGW 121 or 131 may send a create session response message to the SGW 185. The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create session response message to the SGW 185.

Furthermore, the PGW 121 or 131 may perform a function related to delivering a security parameter and a security policy in association with data protection by sending the create session response message to the SWG 185.

Information relating to the security parameter and the security policy may be delivered to the PGW 121 or 131, the SGW 185, and the MIME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether the network is able to support user plane integrity protection, whether a full data rate for user plane integrity protection may be supported, a user plane integrity protection data rate, etc.

In operation 515, the SGW 185 may forward the create session response message to the MME 183.

Furthermore, the SGW 185 may perform a function related to delivering a security parameter and a security policy in association with data protection by sending the create session response message to the MME 183.

Information relating to the security parameter and the security policy may be delivered to the PGW 121 or 131, the SGW 185, and the MIME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user request message may also be delivered by piggybacking on the attach accept message. In other words, the activate default EPS bearer context request message may be contained in the attach accept message.

The attach accept message may include information about whether the network is able to support full data rate security protection, full data integrity protection, etc., in association with data transmission.

TABLE 15

| attach accept message | | | |
|---|---|---|---|
| IEI | information Element | Type/Reference | Presence |
| | Protocol discriminator | Protocol discriminator | M |
| | Security header type | Security header type | M |
| | Attach accept message identity | Message type | M |
| | EPS attach result | EPS attach result | M |
| | Spare half octet | Spare half octet | M |
| | T3412 value | GPRS timer | M |
| | TAI list | Tracking area identity list | M |
| | ESM message container | ESM message container | M |
| | GUTI | EPS mobile identity | O |
| | Location area identification | Location area identification | O |
| | MS identity | Mobile identity | O |
| | EMM cause | EMM cause | O |
| | T3402 value | GPRS timer | O |
| | T3423 value | GPRS time | O |
| | Equivalent PLMNs | PLMN ist | O |
| | Emergency number list | Emergency number list | O |
| | EPS network feature support | EPS network feature support | O |
| | Additional update result | Additional update result | O |
| | T3412 extended value | GPRS timer 3 | O |
| | T3324 value | GPRS timer 2 | O |
| | Extended DRX parameters | Extended DRX parameters | O |
| | DCN-ID | DCN-ID | O |
| | SMS services status | SMS services status | O |
| | Non-3GPP NW provided policies | Non-3GPP NW provided policies | O |
| | T3448 value | GPRS timer 2 | O |
| | Network policy | Network policy | O |
| | T3447 value | GPRS Timer 3 | O |
| | Extended emergency number list | Extended emergency number list | O |
| | Ciphering key data | Ciphering key data | O |
| | UE radio capability ID | UE radio capability ID | O |
| | UE radio capability ID deletion indication | UE radio capability ID deletion indication | O |
| | Negotiated WUS assistance information | WUS assistance information | O |
| | Negotiated DRX parameter in NB-S1 mode | NB-S1 DRX parameter | O |
| | Network security capability | | | profile, the operator's policy, etc., to the PGW 121 or 131, and the information may then delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether user plane integrity protection that may be supported by the network is possible, whether a full data rate for user plane integrity protection may be supported, a user plane integrity protection data rate, etc.

In operation 517, the MME 183 may send an attach accept message to the UE 101. The attach accept message may be delivered to the UE 101 from the MME 183 through the eNB 181. In this case, an activate default EPS bearer context The attach accept message is a message to be sent to the UE from the network, and information about network security capability may be transmitted in the attach accept message. A network security capability IE, i.e., a network security capability parameter, may include information about whether the network supports user plane integrity protection, whether the network supports an extended function of the security protection, maximum rate information of user plane integrity protection that may be supported by the network, etc.

In the meantime, through the activate default EPS bearer context request message, information about e.g., whether full data rate security protection or full rate data integrity protection is allowed by the network in association with bearer establishment, a data rate in association with integrity protection, etc., may be transmitted.

The activate default EPS bearer context request message may be defined as in Table 16 below.

In Table 16, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 16 activate default EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate default EPS bearer context request message identity | Message type | M |
| | EPS QoS | EPS quality of service | M |
| | Access point name | Access point name | M |
| | PDN address | PDN address | M |
| | Transaction identifier | Transaction identifier | O |
| | Negotiated QoS | Quality of service | O |
| | Negotiated LLC SAPI | LLC service access point identifer | O |
| | Radio priority | Radio priority | O |
| | Packet flow Identifier | Packet flow Identifier | O |
| | APN-AMBR | APN aggregate maximum bit rate | O |
| | ESM cause | ESM cause | O |
| | Protocol configuration options | Protocol configuration options | O |
| | Connectivity type | Connectivity type | O |
| | WLAN offload indication | WLAN offload acceptability | O |
| | NBIFOM container | NBIFOM container | O |
| | Header compression configuration | Header compression configuration | O |
| | Control plane only indication | Control plane only indication | O |
| | Extended protocol configuration options | Extended protocol configuration options | O |
| | Serving PLMN rate control | Serving PLMN rate control | O |
| | Extended APN-AMBR | Extended APN aggregate maximum bit rate | O |
| | Allowed security support maximum data rate | Allowed security support maximum data rate | O |
| | Allowed security support data rate | Allowed security support data rate | O |

Figure 6:
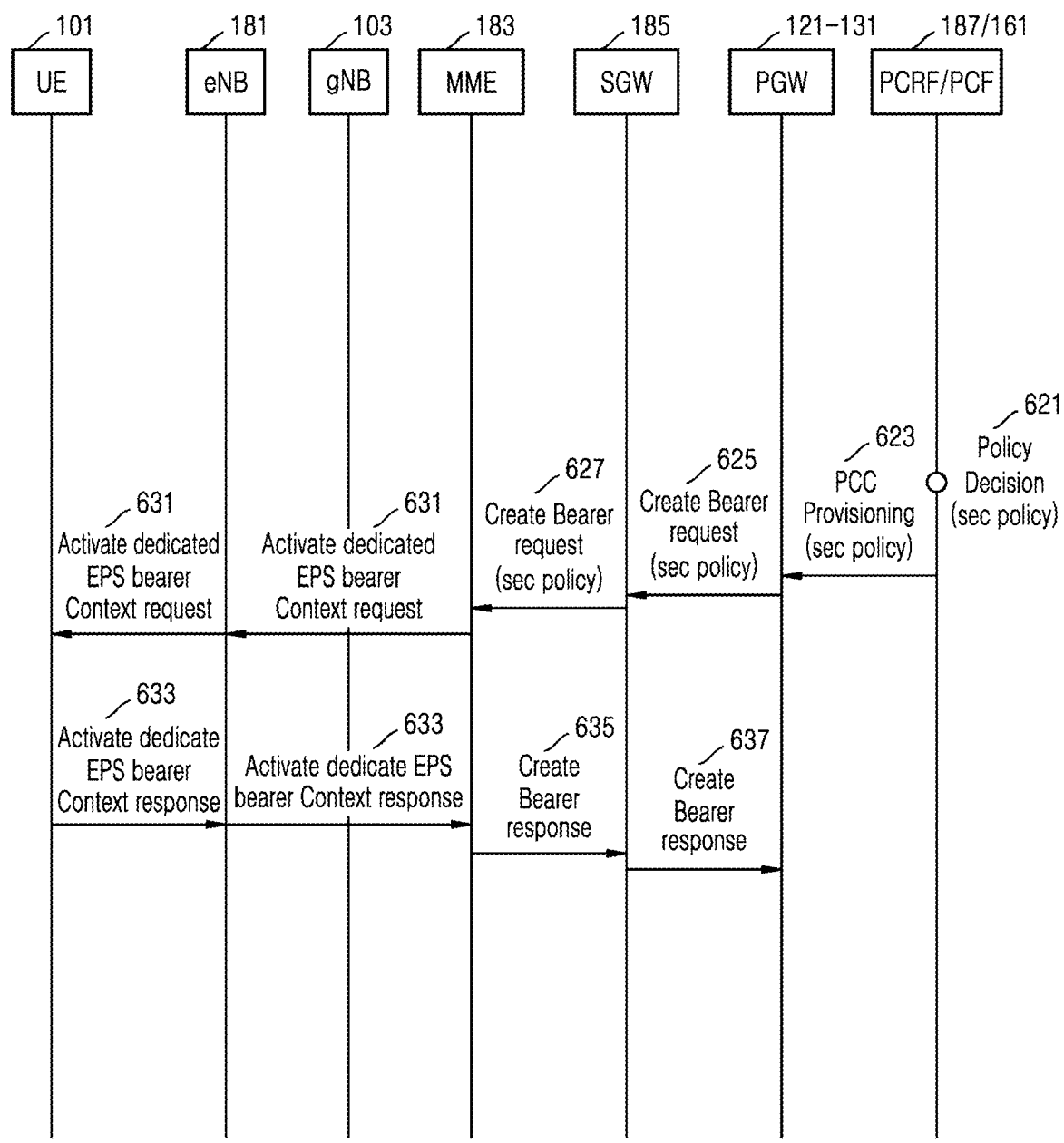
FIG. 6 illustrates a sequence chart for describing a procedure for performing security-enhanced communication using a NAS message in a 4G or 5G network environment according to an embodiment of the present disclosure.

FIG. 6 illustrates a sequence chart for describing a procedure for performing security-enhanced communication using a NAS message in a 4G or 5G network environment, according to an embodiment of the present disclosure.

In operation 621, the PCRF 187/the PCF 161 may make a decision on a policy.

In operation 623, the PCRF 187/the PCF 161 may deliver rate information for user plane integrity protection for the UE 101 and network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, information about a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 625, the PGW 121 or 131 may send a create bearer request message to the SGW 185.

The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create bearer request message to the SGW 185.

Furthermore, the PGW 121 or 131 may perform a function related to delivering a security parameter and a security policy in association with data protection by sending the create bearer request message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 627, the SGW 185 may send a create bearer request message to the MME 183.

Furthermore, the SGW 185 may perform a function related to delivering a security parameter and a security policy in association with data protection by sending the create bearer request message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether the network is able to support user plane integrity protection, whether a full data rate for user plane integrity protection may be supported, a user plane integrity protection data rate, etc.

In operation 631, the MME 183 sends an activate dedicated EPS bearer context request message to the UE 101. The activate dedicated EPS bearer context request message may be delivered to the UE 101 from the MME 183 through the eNB 181.

In the meantime, the activate dedicated EPS bearer context request message may include information about e.g., whether full data rate security protection is allowed by the network in association with bearer establishment or data rate information related to integrity protection.

The activate dedicated EPS bearer context request message may be defined as in Table 17 below.

In Table 17, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 17 activate dedicated EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate dedicated EPS bearer context request message identity | Message type | M |
| | Linked EPS bearer identity | Linked EPS bearer identity | M |
| | Spare half octet | Spare half octet | M |
| | EPS QoS | EPS quality of service | M |
| | TFT | Traffic flow template | M |
| | Transaction identifier | Transaction identifier | O |
| | Negotiated QoS | Quality of service | O |
| | Negotiated LLC SAPI | LLC service access point identifier | O |
| | Radio priority | Radio priority | O |
| | Packet flow Identifier | Packet flow Identifier | O |
| | Protocol configuration options | Protocol configuration options | O |
| | WLAN offload indication | WLAN offload acceptability | O |
| | NBIFOM container | NBIFOM container | O |
| | Extended protocol configuration options | Extended protocol configuration options | O |
| | Extended EPS QoS | Extended quality of service | O |
| | Allowed security maximum data rate | Allowed security maximum data rate | O |
| | Allowed security support data rate | Allowed security support data rate | O |

In operation 633, the UE 101 may send an activate dedicated EPS bearer context response message to the MME 183. The activate dedicated EPS bearer context response message may be delivered from the UE 101 to the MME 183 through the eNB 181.

In operation 635, the MME 183 may send a create bearer response message to the SGW 185.

In operation 637, the SGW 185 may forward the create bearer response message to the PGW 121 or 131.

Figure 7:
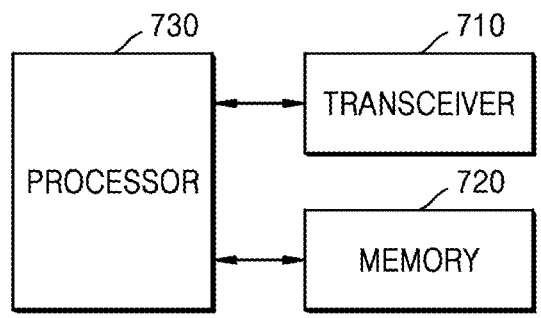
FIG. 7 illustrates a block diagram of a UE according to an embodiment of the present disclosure.

FIG. 7 illustrates a block diagram of a UE according to an embodiment of the present disclosure.

Referring to FIG. 7, the UE in the disclosure may include a transceiver 710, a memory 720, and a processor 730. The transceiver 710, the memory 720, and the processor 730 of the UE may operate according to the aforementioned communication method of the UE. Components of the UE are not, however, limited thereto. For example, the UE may include more or fewer elements than described above. In addition, the processor 730, the transceiver 710, and the memory 720 may be implemented in a single chip.

The transceiver 710 is a collective term of a UE transmitter and a UE receiver, and may transmit or receive a signal to or from a network entity. The signal to be transmitted to or received from the BS may include control information and data. For this, the transceiver 710 may include an RF transmitter for up-converting the frequency of a signal to be transmitted and amplifying the signal and an RF receiver for low-noise amplifying a received signal and down-converting the frequency of the received signal. It is merely an example, and the components of the transceiver 710 are not limited to the RF transmitter and RF receiver.

The transceiver 710 may include a wired/wireless transceiver, including various components for signal transmission and reception.

In addition, the transceiver 710 may receive a signal on a wireless channel and output the signal to the processor 730, and transmit a signal output from the processor 730 on a wireless channel.

The transceiver 710 may receive a communication signal and output the communication signal to the processor 730, and transmit a signal output from the processor 730 to a network entity over a wired or wireless network.

The memory 720 may store a program and data required for operation of the UE. Furthermore, the memory 720 may store control information or data included in a signal obtained by the UE. The memory 720 may include a storage medium such as a read only memory (ROM), a random access memory (RAM), a hard disk, a compact disc ROM (CD-ROM), and a digital versatile disk (DVD), or a combination of storage mediums.

The processor 730 may control a series of processes for the UE to be operated according to the embodiments of the disclosure as described above in connection with FIGS. 1 to 6 and as will be described in connection with 9. The processor 730 may include at least one processor. For example, the processor 730 may include a communication processor (CP) for controlling communication and an application processor (AP) for controlling a higher layer such as an application program.

Figure 8:
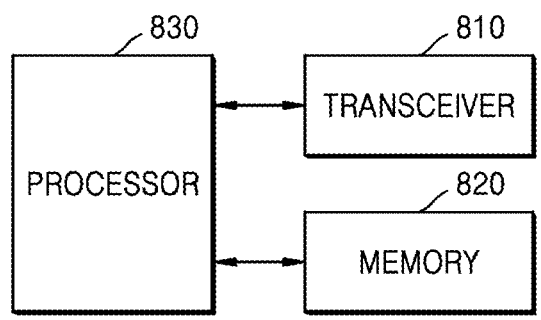
FIG. 8 illustrate a block diagram of a network entity according to an embodiment of the present disclosure.

FIG. 8 illustrates a block diagram of a network entity according to an embodiment of the present disclosure.

Referring to FIG. 8, the network entity in the disclosure may include a transceiver 810, a memory 820, and a processor 830. The transceiver 810, the memory 820, and the processor 830 of the network entity may operate according to the aforementioned communication method of the network entity. Components of the network entity are not, however, limited thereto. For example, the network entity may include more or fewer elements than described above. In addition, the processor 830, the transceiver 810, and the memory 820 may be implemented in a single chip. The network entity may include network functions (NFs) such as an AMF, an SMF, a PCF, a NEF, a UDM, a UPF, etc., as described above. Furthermore, the network entity may include a base station.

The transceiver 810 is a collective term of a network entity transmitter and a network entity receiver, and may transmit or receive a signal to or from a UE or another network entity. The signal to be transmitted to or received may include control information and data. For this, the transceiver 810 may include an RF transmitter for up-converting the frequency of a signal to be transmitted and amplifying the signal and an RF receiver for low-noise amplifying a received signal and down-converting the frequency of the received signal. It is merely an example, and the components of the transceiver 810 are not limited to the RF transmitter and RF receiver. The transceiver 810 may include a wired/wireless transceiver, including various components for signal transmission and reception.

In addition, the transceiver 810 may receive a signal on a communication channel (e.g., a wireless channel) and output the signal to the processor 830, or transmit a signal output from the processor 830 on the communication channel.

The transceiver 810 may receive a communication signal and output the communication signal to the processor 830, and transmit a signal output from the processor 830 to a UE or a network entity over a wired or wireless network.

The memory 820 may store a program and data required for an operation of the network entity. Furthermore, the memory 820 may store control information or data included in a signal obtained by the network entity. The memory 820 may include a storage medium such as a ROM, a RAM, a hard disk, a CD-ROM, and a DVD, or a combination of storage mediums.

The processor 830 may control a series of processes for the network entity to be operated according to the embodiments of the disclosure as described above in connection with FIGS. 1 to 6 and as will be described in connection with 9. The processor 830 may include at least one processor. Methods according to the claims of the disclosure or the embodiments of the disclosure described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus performing the embodiments of the disclosure through an external port. In addition, a separate storage device in the communication network may be connected to the apparatus performing the embodiments of the disclosure.

Figure 9:
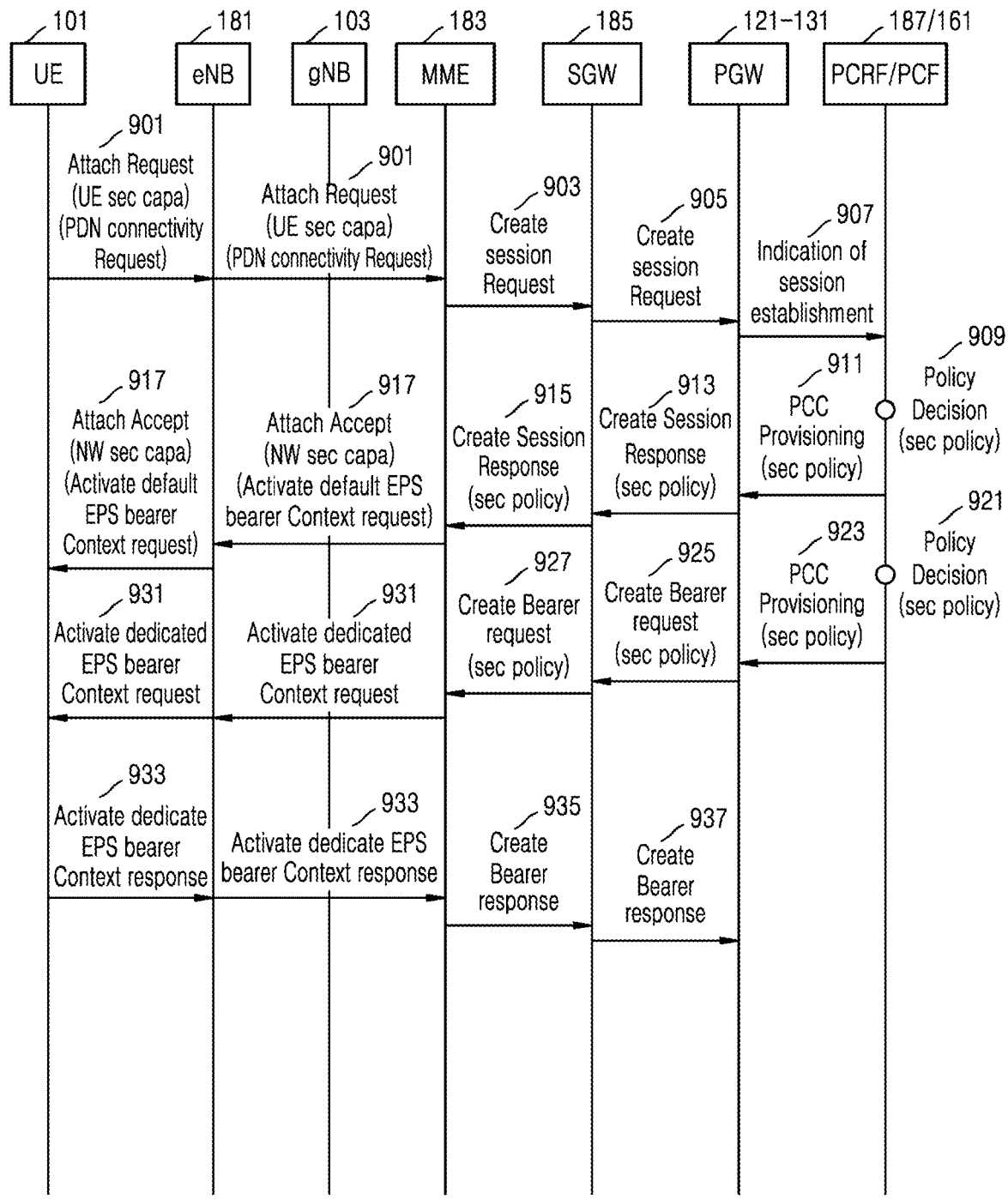
FIG. 9 illustrates a sequence chart for describing a procedure for performing security-enhanced communication using a NAS message in a 4G or 5G network environment according to an embodiment of the present disclosure.

FIG. 9 illustrates a sequence chart for describing a procedure for performing security-enhanced communication using a NAS message in a 4G or 5G network environment according to an embodiment of the present disclosure.

In operation 901, the UE 101 may send an attach request to the MME 183. The attach request message to be sent to the MME 183 from the UE 101 may be forwarded to the MME 183 through the eNB 181 from the UE 101. The attach request message may include a PDN connectivity request message. Specifically, the PDN connectivity request message may be transmitted by piggybacking on the attach request message.

The attach request message may include capability information about whether the UE 101 supports full rate data protection in LTE or even non-standalone optional 5G deployment.

The attach request message is as in Table 18 below.

The attach request message may include, as shown in Table 18, information about whether to support additional security protection, whether to support additional user plane integrity protection, whether the UE 101 supports a full data rate for user plane integrity protection, whether the UE 101 has such a supporting capability, or the like to be delivered to the network.

Case 1) Use of Additional Security Protection Parameter

In an embodiment of the disclosure, an additional security protection IE, i.e., an additional security protection parameter, included and sent in the attach request message is a parameter to be sent from the UE 101 to the network. Information delivered by the additional security protection parameter indicates whether the UE has capability to support user plane related security protection. Specifically, the information may indicate a UE capability regarding user plane security protection or user plane integrity protection or whether the UE is able to support the user plane integrity protection even at a full rate, or information regarding a maximum data rate that may be supported for the user plane integrity protection.

Case 2) Use of UE Security Capability Parameter

In another embodiment of the disclosure, information may be delivered from the UE to the network by using a UE security capability IE sent in the attach request message. The information delivered indicates whether the UE has capability to support user plane related security protection. Specifically, the information may indicate a UE capability regarding support user plane security protection or user plane integrity protection or whether the UE is able to support the user plane integrity protection even at a full rate, or information regarding a maximum data rate that may be supported for the user plane integrity protection.

TABLE 18

| IEI | Information Element | Type/Reference | Presence |
|---|---|---|---|
| | Protocol discriminator | Protocol discriminator | M |
| | Security header type | Security header type | M |
| | Attach request message identity | Message type | M |
| | EPS attach type | EPS attach type | M |
| | NAS key set identifier | NAS key set identifier | M |
| | EPS mobile identity | EPS mobile identity | M |
| | UE network capability | UE network capability | M |
| | ESM message container | ESM message container | M |
| | Old P-TMSI signature | P-TMSI signature | O |
| | Additional GUTI | EPS mobile identity | O |
| | Last visited registered TAI | Tracking area identity | O |
| | DRX parameter | DRX parameter | O |
| | MS network capability | MS network capability | O |
| | Old location area identification | Location area identification | O |
| | TMSI status | TMSI status | O |
| | Mobile station classmark 2 | Mobile station classmark 2 | O |
| | Mobile station classmark 3 | Mobile station classmark 3 | O |
| | Supported Codecs | Supported Codec List | O |
| | Additional update type | Additional update type | O |
| | Voice domain preference and UE's usage setting | Voice domain preference and UE's usage setting | O |
| | Device properties | Device properties | O |
| | Old GUTI type | GUTI type | O |
| | MS network feature support | MS network feature support | O |
| | TMSI based NRI container | Network resource identifier container | O |
| | T3324 value | GPRS timer 2 | O |
| | T3412 extended value | GPRS timer 3 | O |
| | Extended DRX parameters | Extended DRX parameters | O |
| | UE additional security capability | UE additional security capability | O |
| | UE status | UE status | O |
| | Additional information requested | Additional information requested | O |
| | N1 UE network capability | N1 UE network capability | O |
| | UE radio capability ID availability | UE radio capability ID availability | O |

TABLE 18-continued

| | attach request message | | |
|---|---|---|---|
| IEI | Information Element | Type/Reference | Presence |
| | Requested WUS assistance information | WUS assistance information | O |
| | DRX parameter in NB-S1 mode | NB-S1 DRX parameter | O |
| | Additional Security protection Security protection maximum data rate | | |

The attach request message may include the following parameters.

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. The information notified by the UE to the network may include 3) information about a maximum data rate for each UE used for security protection for the uplink, and 4) information about a maximum data rate for each UE used for security protection for the downlink.

The PDN connectivity request message may include a security protection maximum data rate parameter.

The PDN connectivity request message may be defined as in Table 19 below.

TABLE 19

| | PDN connectivity request message | | |
|---|---|---|---|
| IEI | Information Element | Type/Reference | Presence |
| | Protocol discriminator | Protocol discriminator | M |
| | EPS bearer identity | EPS bearer identity | M |
| | Procedure transaction identity | Procedure transaction identity | M |
| | PDN connectivity request message identity | Message type | M |
| | Request type | Request type | M |
| | PDN type | PDN type | M |
| | ESM information transfer flag | ESM information transfer flag | O |
| | Access point name | Access point name | O |
| | Protocol configuration options | Protocol configuration options | O |
| | Device properties | Device properties | O |
| | NBIFOM container | NBIFOM container | O |
| | Header compression configuration | Header compression configuration | O |
| | Extended protocol configuration options | Extended protocol configuration options | O |
| | Security protection maximum data rate | | |

A security protection maximum data rate IE, i.e., the security protection maximum data rate parameter, is for the UE to notify the network of information. The information notified by the UE to the network may include 1) information about a maximum data rate for each UE used for user plane integrity protection for the uplink, and 2) information about a maximum data rate for each UE used for user plane integrity protection for the downlink. The information notified by the UE to the network may include 3) information about a maximum data rate for each UE used for security protection for the uplink, and 4) information about a maximum data rate for each UE used for security protection for the downlink.

In operation 903, the MME 183 may send a create session request message to the SGW 185.

In operation 905, the SGW 185 may forward the create session request message to the PGW 121 or 131.

In operation 907, the PGW 121 or 131 may send a session establishment indication message to the PCRF 187/the PCF 161.

In operation 909, the PCRF 187/the PCF 161 may make a decision on a policy.

In operation 911, the PCRF 187/the PCF 161 may perform a role of delivering rate information for user plane integrity protection of the UE 101 and the network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowed for each user based on the subscription or the operator's policy, a policy about whether the full data rate integrity protection is allowable, a data rate for integrity protection, etc.

In operation 913, the PGW 121 or 131 may send a create session response message to the SGW 185. The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create session response message to the SGW 185.

Furthermore, the PGW 121 or 131 may perform a function related to delivering a security parameter and a security policy in association with data protection by sending the create session response message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether the network is able to support user plane integrity protection, whether a full data rate for user plane integrity protection may be supported, a user plane integrity protection data rate, etc.

In operation 915, the SGW 185 may forward the create session response message to the MME 183.

Furthermore, the SGW 185 may perform a function related to delivering a security parameter and a security policy in association with data protection by sending the create session response message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether user plane integrity protection that may be supported by the network is possible, whether a full data rate for user plane integrity protection may be supported, a user plane integrity protection data rate, etc.

In operation 917, the MME 183 may send an attach accept message to the UE 101. The attach accept message may be delivered to the UE 101 from the MME 183 through the eNB 181. In this case, an activate default EPS bearer context request message may also be delivered by piggybacking on the attach accept message. In other words, the activate default EPS bearer context request message may be contained in the attach accept message.

The attach accept message may include information about whether the network is able to support full data rate security protection, full data integrity protection, etc., in association with data transmission.

The attach accept message may include the following parameters.

Through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 20

| | | attach accept message | |
|---|---|---|---|
| IEI | information Element | Type/Reference | Presence |
| | Protocol discriminator | Protocol discriminator | M |
| | Security header type | Security header type | M |
| | Attach accept message identity | Message type | M |
| | EPS attach result | EPS attach result | M |
| | Spare half octet | Spare half octet | M |
| | T3412 value | GPRS timer | M |
| | TAI list | Tracking ares identity list | M |
| | ESM message container | ESM message container | M |
| | GUTI | EPS mobile identity | O |
| | Location area identification | Location area identification | O |

TABLE 20-continued attach accept message

| IEI | information Element | Type/Reference | Presence |
|---|---|---|---|
| | MS identity | Mobile identity | O |
| | EMM cause | EMM cause | O |
| | T3402 value | GPRS timer | O |
| | T3423 value | GPRS timer | O |
| | Equivalent PLMNS | PLMN list | O |
| | Emergency number list | Emergency number list | O |
| | EPS network feature support | EPS network feature support | O |
| | Additional update result | Additional update result | O |
| | T3412 extended value | GPRS timer 3 | O |
| | T3324 value | GPRS timer 2 | O |
| | Extended DRX parameters | Extended DRX parameters | O |
| | DCN-ID | DCN-ID | O |
| | SMS services status | SMS services status | O |
| | Non-3GPP NW provided policies | Non-3GPP NW provided policies | O |
| | T3448 value | GPRS timer 2 | O |
| | Network policy | Network policy | O |
| | T3447 value | GPRS timer 3 | O |
| | Extended emergency number list | Extended emergency number list | O |
| | Ciphering key data | Ciphering key data | O |
| | UE radio capability ID | UE radio capability ID | O |
| | UE radio capability ID deletion indication | UE radio capability ID deletion indication | O |
| | Negotiated WUS assistance information | WUS assistance information | O |
| | Negotiated DRX parameter in NB-S1 mode | NB-S1 DRX parameter | O |
| | Network security capability | | |
| | Allowed security support maximum data rate | Allowed security support maximum data rate | O |
| | Allowed security support data rate | Allowed security support data rate | O |

The attach accept message is a message to be sent to the UE from the network, and information about network security capability may be transmitted in the attach accept message. A network security capability IE, i.e., a network security capability parameter, may include information about whether the network supports user plane integrity protection, whether the network supports an extended function of the security protection, maximum rate information of user plane integrity protection that may be supported by the network, etc.

In the meantime, through the activate default EPS bearer context request message, information about e.g., whether full data rate security protection or full rate data integrity protection is allowed by the network in association with bearer establishment, a data rate in association with integrity protection, etc., may be transmitted.

The activate default EPS bearer context request message may be defined as in Table 21 below.

In Table 21, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

TABLE 21 activate default EPS bearer context request message

| IEI | Information Element | Type/Reference | Presence |
|---|---|---|---|
| | Protocol discriminator | Protocol discriminator | M |
| | EPS bearer identity | EPS bearer identity | M |
| | Procedure transaction identity | Procedure transaction identity | M |
| | Activate default EPS bearer context request message identity | Message type | M |
| | EPS QoS | EPS quality of service | M |
| | Access point name | Access point name | M |
| | PDN address | PDN address | M |
| | Transaction identifier | Transaction identifier | O |
| | Negotiated QoS | Quality of service | O |
| | Negotiated LLC SAPI | LLC service access point identifer | O |
| | Radio priority | Radio priority | O |
| | Packet flow Identifier | Packet flow Identifier | O |
| | APN-AMBR | APN aggregate maximum bit rate | O |
| | ESM cause | ESM cause | O |

TABLE 21-continued activate default EPS bearer context request message

| IEI | Information Element | Type/Reference | Presence |
|---|---|---|---|
| | Protocol configuration options | Protocol configuration options | O |
| | Connectivity type | Connectivity type | O |
| | WLAN offload indication | WLAN offload acceptability | O |
| | NBIFOM container | NBIFOM container | O |
| | Header compression configuration | Header compression configuration | O |
| | Control plane only indication | Control plane only indication | O |
| | Extended protocol configaration options | Extended protocol configuration options | O |
| | Serving PLMN rate control | Serving PLMN rate control | O |
| | Extended APN-AMBR | Extended APN aggregate maximum bit rate | O |
| | Allowed security support maximum data rate | Allowed security support maximum data rate | O |
| | Allowed security support data rate | Allowed security support data rate | O |

In operation 921, the PCRF 187/the PCF 161 may make a decision on a policy.

In operation 923, the PCRF 187/the PCF 161 may deliver rate information for user plane integrity protection for the UE 101 and network entities to the PGW 121 or 131. Furthermore, the PCRF 187/the PCF 161 may provision a PCC rule for the PGW 121 or 131.

The PCRF 187/the PCF 161 is an entity to do a role of delivering a QoS profile to be usually used by the UE 101 to the PGW 121 or 131. For example, information about a charging method (e.g., whether charging is performed offline, online, on a time basis, on a data volume basis, or the like) may be delivered. That is, a policy, QoS, and a charging method may be determined for each subscriber.

In addition, the PCRF 187/the PCF 161 may perform a security policy related function. For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc.

In this case, regarding data integrity protection, the PCRF 187/the PCF 161 may deliver information about whether the network is able to support user plane integrity protection, whether full data rate integrity protection is allowable for each user based on the subscription or the operator's policy, a policy about whether the full data rate integrity protection is allowable, a data rate for integrity protection, etc.

In operation 925, the PGW 121 or 131 may send a create bearer request message to the SGW 185.

The PGW 121 or 131 may create an EPS bearer (a GTP tunnel) based on QoS information received from the PCRF 187/the PCF 161. The PGW 121 or 131 may deliver a QoS profile provided by the PCRF 187/the PCF 161 by sending the create bearer request message to the SGW 185.

Furthermore, the PGW 121 or 131 may perform a function related to delivering a security parameter and a security policy in association with data protection by sending the create bearer request message to the SWG 185.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the PGW 121 or 131 may deliver information about whether user plane integrity protection that may be supported by the network is possible, whether a full data rate for user plane integrity protection may be supported, a user plane integrity protection data rate, etc.

In operation 927, the SGW 185 may send a create bearer request message to the MME 183.

Furthermore, the SGW 185 may perform a function related to delivering a security parameter and a security policy in association with data protection by sending the create bearer request message to the MME 183.

Information relating to the security parameter and the security policy may be delivered to the PGW 121 or 131, the SGW 185, and the MME 183 from the PCRF 187/the PCF 161.

For example, for integrity protection for user plane data in an operator network, and further for supporting full rate integrity protection for user plane data, the PCRF 187/the PCF 161 may deliver policy information about whether to support user plane integrity protection at a full data rate or information about whether to support integrity protection at the full data rate in communication of the UE 101 or a network entity based on subscription of the UE 101, a user profile, the operator's policy, etc., to the PGW 121 or 131, and the information may then be delivered to the MME 183 through the SGW 185.

In this case, regarding data integrity protection, the information delivered may include information about whether the network is able to support user plane integrity protection, whether full data rate integrity protection is allowable for each user based on the subscription or the operator's policy, a policy about whether the full data rate integrity protection is allowable, a data rate for integrity protection, etc.

In an embodiment of the disclosure, regarding data integrity protection, the SGW 185 may deliver information about whether the network is able to support user plane integrity protection, whether a full data rate for user plane integrity protection may be supported, a user plane integrity protection data rate, etc.

In operation 931, the MME 183 sends an activate dedicated EPS bearer context request message to the UE 101. The activate dedicated EPS bearer context request message may be delivered to the UE 101 from the MME 183 through the eNB 181.

In the meantime, the activate dedicated EPS bearer context request message may include information about e.g., whether full data rate security protection is allowed by the network in association with bearer establishment or data rate information related to integrity protection.

The activate dedicated EPS bearer context request message may be defined as in Table 22 below.

In Table 22, through an allowed security maximum data rate IE, i.e., an allowed security maximum data rate parameter, maximum data rate information for user plane integrity protection in association with security protection supported by the network may be delivered. Information about any of a data rate requested by the UE or a maximum data rate that may be supported by the UE, which may be used for integrity protection that the network intends to provide for the UE, may be delivered through an allowed security support data rate IE, i.e., an allowed security support data rate parameter.

In operation 937, the SGW 185 may forward the create bearer response message to the PGW 121 or 131.

According to an embodiment of the disclosure, security-enhanced data transmission may be efficiently supported in the wireless communication system.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have thus been described, but it will be understood that various modifications can be made without departing the scope of the disclosure. Thus, it will be apparent to those ordinary skilled in the art that the disclosure is not limited to the embodiments described, but can encompass not only the appended claims but the equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) for protecting data, the method comprising:
transmitting, to a mobility management entity (MME) via a base station, an attach request message including at least one security protection parameter associated with a UE capability to support a security protection for a user plane; and
when a first security policy is determined at a policy control entity based on the attach request message and information of the first security policy is received at the MME, receiving, from the MME via the base station,

TABLE 22 activate dedicated EPS bearer context request message

| IEI | Information Element | Type/Reference | Presence |
|---|---|---|---|
|  | Protocol discriminator | Protocol discriminator | M |
|  | EPS bearer identity | EPS bearer identity | M |
|  | Procedure transaction identity | Procedure transaction identity | M |
|  | Activate dedicated EPS bearer context request message identity | Message type | M |
|  | Linked EPS bearer identity | Linked EPS bearer identity | M |
|  | Spare half octet | Spare half octet | M |
|  | EPS QoS | EPS quality of service | M |
|  | TFT | Traffic flow template | M |
|  | Transaction identifier | Transaction identifier | O |
|  | Negotiated QoS | Quality of service | O |
|  | Negotiated LLC SAPI | LLC service access point identifier | O |
|  | Radio priority | Radio priority | O |
|  | Packet flow Identifier | Packet flow Identifier | O |
|  | Protocol configuration options | Protocol configuration options | O |
|  | WLAN offload indication | WLAN offload acceptability | O |
|  | NBIFOM container | NBIFOM container | O |
|  | Extended protocol configuration options | Extended protocol configuration options | O |
|  | Extended EPS QoS | Extended quality of service | O |
|  | Allowed security maximum data rate | Allowed security maximum data rate | O |
|  | Allowed security support data rate | Allowed security support data rate | O |

In operation 933, the UE 101 may send an activate dedicated EPS bearer context response message to the MME 183. The activate dedicated EPS bearer context response message may be delivered from the UE 101 to the MME 183 through the eNB 181.

In operation 935, the MME 183 may send a create bearer response message to the SGW 185.

an attach accept message including at least one security protection parameter associated with a network capability for the first security policy related with an evolved packet system (EPS) bearer.

2. The method of claim 1, wherein:
the attach request message further includes maximum data rate information related with the security protection; and
the maximum data rate information includes at least one of information for a maximum data rate corresponding to each UE used for a user plane integrity protection or information for the maximum data rate corresponding to each UE used for the security protection.

3. The method of claim 2, wherein:
the attach request message piggybacks a packet data network (PDN) connectivity request message; and
the information for the maximum data rate related with the security protection is piggybacked in the PDN connectivity request message.

4. The method of claim 1, further comprising:
when a second security policy is determined at the policy control entity and information for the second security policy is received at the MME, receiving an activate dedicated EPS bearer context request message including the at least one security protection parameter associated with a network capability for the second security policy related with another EPS bearer.

5. A method of a mobility management entity (MME) for protecting data, the method comprising:
receiving, from a user equipment (UE) via a base station, an attach request message including at least one security protection parameter associated with a UE capability to support a security protection for a user plane; and
when a first security policy is determined at a policy control entity based on the attach request message and information of the first security policy is received at the MME, transmitting, to the UE via the base station, an attach accept message including at least one security protection parameter associated with a network capability for the first security policy related with an evolved packet system (EPS) bearer.

6. The method of claim 5, wherein:
the attach request message further includes maximum data rate information related with the security protection; and
the maximum data rate information includes at least one of information for a maximum data rate corresponding to each UE used for a user plane integrity protection or information for the maximum data rate corresponding to each UE used for the security protection.

7. The method of claim 6, wherein:
the attach request message piggybacks a packet data network (PDN) connectivity request message; and
the information for the maximum data rate related with the security protection is piggybacked in the PDN connectivity request message.

8. The method of claim 5, further comprising:
when a second security policy is determined at the policy control entity and information for the second security policy is received at the MME, transmitting an activate dedicated EPS bearer context request message including the at least one security protection parameter associated with a network capability for the second security policy related with another EPS bearer.

9. A user equipment (UE) for protecting data, the UE comprising:
a transceiver; and
at least one processor coupled with the transceiver and configured to:
transmit, to a mobility management entity (MME) via a base station, an attach request message including at least one security protection parameter associated with a UE capability to support a security protection for a user plane, and
when a first security policy is determined at a policy control entity based on the attach request message and information of the first security policy is received at the MME, receive, from the MME via the base station, an attach accept message including at least one security protection parameter associated with a network capability for the first security policy related with an evolved packet system (EPS) bearer.

10. The UE of claim 9, wherein:
the attach request message further includes maximum data rate information related with the security protection; and
the maximum data rate information includes at least one of information for a maximum data rate corresponding to each UE used for a user plane integrity protection or information for the maximum data rate corresponding to each UE used for the security protection.

11. The UE of claim 10, wherein:
the attach request message piggybacks a packet data network (PDN) connectivity request message; and
the information for the maximum data rate related with the security protection is piggybacked in the PDN connectivity request message.

12. The UE of claim 9, wherein the at least one processor is further configured to
when a second security policy is determined at the policy control entity and information for the second security policy is received at the MME, receive an activate dedicated EPS bearer context request message including the at least one security protection parameter associated with a network capability for the second security policy related with another EPS bearer.

13. A mobility management entity (MME) for protecting data, the MME comprising:
a transceiver; and
at least one processor coupled with the transceiver and configured to:
receive, from a user equipment (UE) via a base station, an attach request message including at least one security protection parameter associated with a UE capability to support a security protection for a user plane, and
when a first security policy is determined at a policy control entity based on the attach request message and information of the first security policy is received at the MME, transmit, to the UE via the base station, an attach accept message including at least one security protection parameter associated with a network capability for the first security policy related with an evolved packet system (EPS) bearer.

14. The MME of claim 13, wherein:
the attach request message further includes maximum data rate information related with the security protection; and
the maximum data rate information includes at least one of information for a maximum data rate corresponding to each UE used for a user plane integrity protection or information for the maximum data rate corresponding to each UE used for the security protection.

15. The MME of claim 14, wherein:
the attach request message piggybacks a packet data network (PDN) connectivity request message; and
the information for the maximum data rate related with the security protection is piggybacked in the PDN connectivity request message.

16. The MME of claim 13, wherein the at least one processor is further configured to:
when a second security policy is determined at the policy control entity and information for the second security policy is received at the MME, transmit an activate dedicated EPS bearer context request message including the at least one security protection parameter associated with a network capability for the second security policy related with another EPS bearer.

* * * * *